(12) United States Patent
Mori et al.

(10) Patent No.: US 8,452,528 B2
(45) Date of Patent: May 28, 2013

(54) VISUAL RECOGNITION AREA ESTIMATION DEVICE AND DRIVING SUPPORT DEVICE

(75) Inventors: Hiroki Mori, Susono (JP); Shintaro Yoshizawa, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 69 days.

(21) Appl. No.: 13/143,501

(22) PCT Filed: May 12, 2009

(86) PCT No.: PCT/JP2009/058850
§ 371 (c)(1),
(2), (4) Date: Jul. 6, 2011

(87) PCT Pub. No.: WO2010/131331
PCT Pub. Date: Nov. 18, 2010

(65) Prior Publication Data
US 2012/0046857 A1 Feb. 23, 2012

(51) Int. Cl.
*G06G 7/78* (2006.01)
*G06G 1/16* (2006.01)

(52) U.S. Cl.
USPC .......................................................... 701/301

(58) Field of Classification Search
USPC .................. 701/301, 410–414, 420, 423–427, 701/436, 444–446, 454, 527; 382/165, 170, 382/181; 706/20, 45
See application file for complete search history.

(56) References Cited

U.S. PATENT DOCUMENTS

| | | | |
|---|---|---|---|
| 2008/0037837 A1* | 2/2008 | Noguchi et al. | 382/118 |
| 2009/0297041 A1* | 12/2009 | Nagamine et al. | 382/209 |
| 2010/0322475 A1* | 12/2010 | Ikeda | 382/103 |

FOREIGN PATENT DOCUMENTS

| | | |
|---|---|---|
| JP | A-11-205497 | 7/1999 |
| JP | A-2003-80969 | 3/2003 |
| JP | A-2005-267108 | 9/2005 |
| JP | A-2006-502796 | 1/2006 |
| JP | A-2006-163828 | 6/2006 |
| JP | A-2007-334810 | 12/2007 |
| JP | A-2008-262388 | 10/2008 |
| WO | WO 2004/034905 A1 | 4/2004 |

OTHER PUBLICATIONS

Dec. 24, 2010 International Preliminary Report on Patentability issued in International Patent Application No. PCT/JP2009/058850 (translation).
International Search Report for International Patent Application No. PCT/JP2009/058850, mailed on Aug. 25, 2009.

* cited by examiner

*Primary Examiner* — Mary Cheung
(74) *Attorney, Agent, or Firm* — Oliff & Berridge, PLC

(57) ABSTRACT

An object of the invention is to provide a visual recognition area estimation device that can accurately estimate an area recognized by a driver in real time. The visual recognition area estimation device of the present invention calculates the visual recognition area recognized by the driver by means of the visual recognition area calculation portion 11 based on the eyes of the driver, and estimates a time series visual recognition area as the area currently recognized by the driver by means of the visual recognition time space map creation portion 14 based on histories of a plurality of visual recognition areas calculated from the past to the present for a predetermined time. In this manner, by estimating the time series visual recognition area also including the past visual recognition area, the area currently recognized by the driver can be accurately estimated, and the eyes of the driver are not correlated with the obstacle but based on the standard area. Thus, it is possible to prevent the throughput from becoming too large, whereby the estimation processing in real time is possible.

5 Claims, 18 Drawing Sheets

Fig.11
(a)
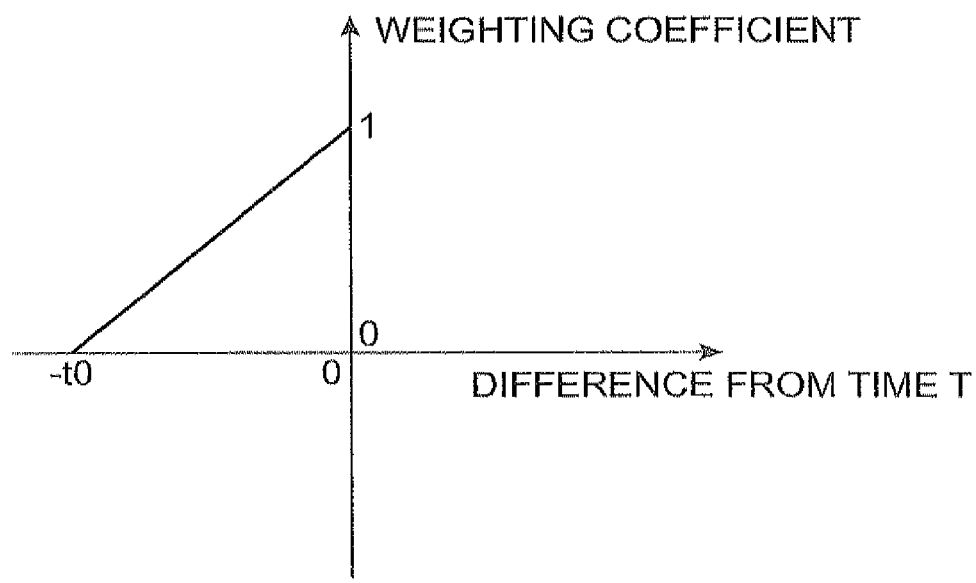
(b)
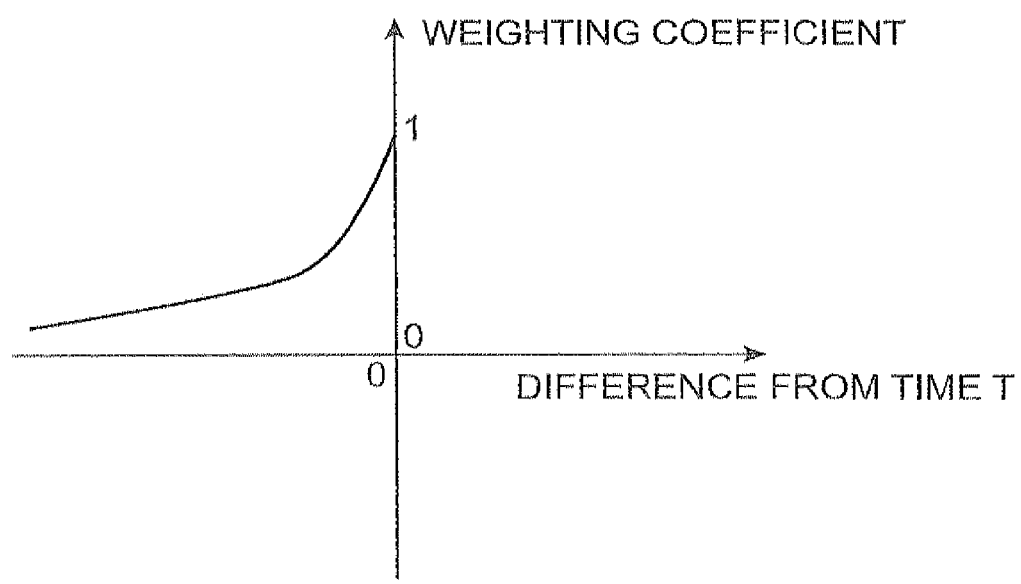

VISUAL RECOGNITION AREA ESTIMATION DEVICE AND DRIVING SUPPORT DEVICE

TECHNICAL FIELD

The present invention relates to a visual recognition area estimation device and a driving support device.

BACKGROUND ART

In the related art, a warning device is considered which warns a driver about obstacles existing around a vehicle. For example, in a warning device disclosed in Patent Literature 1, obstacles around a vehicle and the direction of eyes of a driver are detected, respectively, and it is determined whether or not the driver recognizes the obstacles by the comparison of the positions of the detected obstacles with the direction of eyes. Furthermore, the warning device warns about the obstacles which are determined not to be recognized by the driver.

CITATION LIST

Patent Literature

Japanese Unexamined Patent Application Publication No. 2006-163828

SUMMARY OF INVENTION

Technical Problem

However, in the warning device disclosed in Patent Literature 1, since it is determined whether or not the visual recognition by a driver exists while constantly correlating the positions of the obstacles with the direction of eyes of the driver, for example, when a plurality of obstacles exists around a vehicle, the throughput of the decision processing becomes too large. For this reason, there is a problem in that the processing in real time becomes difficult. In particular, this problem is noticeable in a dynamic scene. Furthermore, since the direction of eyes of the driver is constantly changing, there is also a problem in that determination accuracy declines.

Thus, an object of the present invention is to provide a visual recognition area estimation device and a driving support device that can accurately estimate an area recognized by a driver in real time.

Solution to Problem

A visual recognition area estimation device of the present invention solving the above problem includes visual recognition area calculation means that calculates a visual recognition area recognized by a driver based on eyes of the driver; and time series visual recognition area estimation means that estimates a time series visual recognition area as an area which is currently being recognized by the driver based on histories of a plurality of visual recognition areas calculated from the past to the present for a predetermined time.

According to the visual recognition area estimation means of the present invention, the visual recognition area recognized by the driver is calculated by the visual recognition area calculation means based on the eyes of the driver. Furthermore, the time series visual recognition area as an area, which is currently being recognized by the driver, is estimated by the time series visual recognition area estimation means based on the histories of the plurality of visual recognition areas calculated from the past to the present for a predetermined time.

In this manner, by estimating the time series visual recognition area also including the past visual recognition area, it is possible to accurately estimate the area that is currently being recognized by the driver. Furthermore, since the eyes of the driver are not correlated with the obstacles but based on a standard area, the estimation processing in real time is possible.

Herein, the visual recognition area estimation device of the present invention may include caution degree setting means that sets degrees of caution of the driver relating to the plurality of visual recognition areas, which are calculated from the past to the present for a predetermined time, for each of the plurality of visual recognition areas.

According to the present invention, by means of the caution degree setting means, degrees of caution of the driver relating to the plurality of visual recognition areas, which are calculated from the past to the present for a predetermined time, are set for each of the plurality of visual recognition areas. By setting the degrees of caution, it is possible to weight the degree of caution depending on a degree of novelty of the visual recognition area or a position in the visual recognition area. Since the time series visual recognition area is estimated based on the histories of the plurality of weighted visual recognition areas in this manner, it is possible to exactly estimate the caution state of the driver in the time series visual recognition area.

Furthermore, in the visual recognition area estimation device of the present invention, the caution degree setting means may set the degree of caution smaller as the time of the driver recognizing the visual recognition area becomes older.

Usually, it is considered that the degree of caution of the current driver in the visual recognition area is reduced to the extent that the visual recognition area is in the past visual recognition area. According to the present invention, by means of the caution degree setting means, the degree of caution is set smaller as the time of the driver recognizing the visual recognition area becomes older. By reflecting a reduction of degree of caution of the driver in accordance with the elapse of time in the visual recognition area in this manner, it is possible to more accurately estimate the caution state of the driver in the time series visual recognition area.

Furthermore, in the visual recognition area estimation device of the present invention, the visual recognition area calculation means may include basic visual recognition area calculation means that calculates a basic visual recognition area which is set based on the direction of eyes of the driver; and dead area exclusion means that estimates a dead area of the driver generated by an obstacle existing in the basic visual recognition area and calculates the visual recognition area by excluding the dead area from the basic visual recognition area.

According to the present invention, by means of the basic visual recognition area calculation means, the basic visual recognition area to be set based on the direction of eyes of a driver is calculated. Furthermore, the dead area of the driver generated by the obstacle existing in the basic visual recognition area is excluded from the basic visual recognition area by means of the dead area exclusion means, whereby the visual recognition area is calculated. By setting the area except for the dead area as the visual recognition area in this manner, the dead area, which cannot actually be recognized by the driver, is not included in the visual recognition area. Thus, it is possible to prevent an erroneous estimation in which the dead area is determined as the visual recognition area.

Furthermore, in the visual recognition area estimation device of the present invention, the visual recognition area calculation means may include basic visual recognition area calculation means that calculates the basic visual recognition area to be set based on the direction of eyes of the driver; and mirror area addition means that estimates a mirror area recognizable by the driver via a mirror when the mirror exists in the direction of eyes of the driver, and calculates the visual recognition area by adding the mirror area to the basic visual recognition area.

According to the present invention, the basic visual recognition area to be set based on the direction of eyes of the driver is calculated by means of the basic visual recognition area calculation means. Furthermore, when the mirror exists in the direction of eyes of the driver, the mirror area recognizable by a driver via the mirror is added to the basic visual recognition area by means of the mirror area addition means, whereby the visual recognition area is calculated. By setting the area added with the mirror area as the visual recognition area in this manner, an area, which is indirectly recognizable by the driver via the mirror, is included in the visual recognition area. Thus, it is possible to estimate the visual recognition area by an indirect visual recognition as well as a direct visual recognition.

Furthermore, a driving support device of the present invention includes the aforementioned visual recognition area estimation device, and includes observation point extraction means that extracts an observation point that needs to be observed by the driver from a travelling environment; and caution state determination means that determines a caution state of the driver relative to the observation point depending on whether or not the observation point is situated within a time series visual recognition area.

According to the driving support means of the present invention, the observation point that needs to be observed by the driver is extracted by the observation point extraction means from a travelling environment. Furthermore, depending on whether or not the observation point is situated within the time series visual recognition area, the caution state of the driver relative to the observation point is determined by the caution state determination means. In this manner, since the caution state of the driver is determined by the comparison of the time series visual recognition area with the observation point, there is no need to correlate the eyes of the driver with the observation point. Thus, it is possible to prevent the throughput from becoming too large, whereby the determination processing in real time is possible.

Advantageous Effects of Invention

According to the present invention, it is possible to accurately estimate an area which is being recognized by a driver in real time.

BRIEF DESCRIPTION OF DRAWINGS

FIGS. 11A and 11B are explanation diagrams of a weighting coefficient used in the degree of caution renewal.

DESCRIPTION OF EMBODIMENTS

Hereinafter, a preferred embodiment of the present invention will be described with reference to the drawings. In the following description, terms such as "position" and "area" refer to a position and an area that are shown by three-dimensional coordinates based on a world coordinate system in a case where they are not specifically described.

Figure 1:
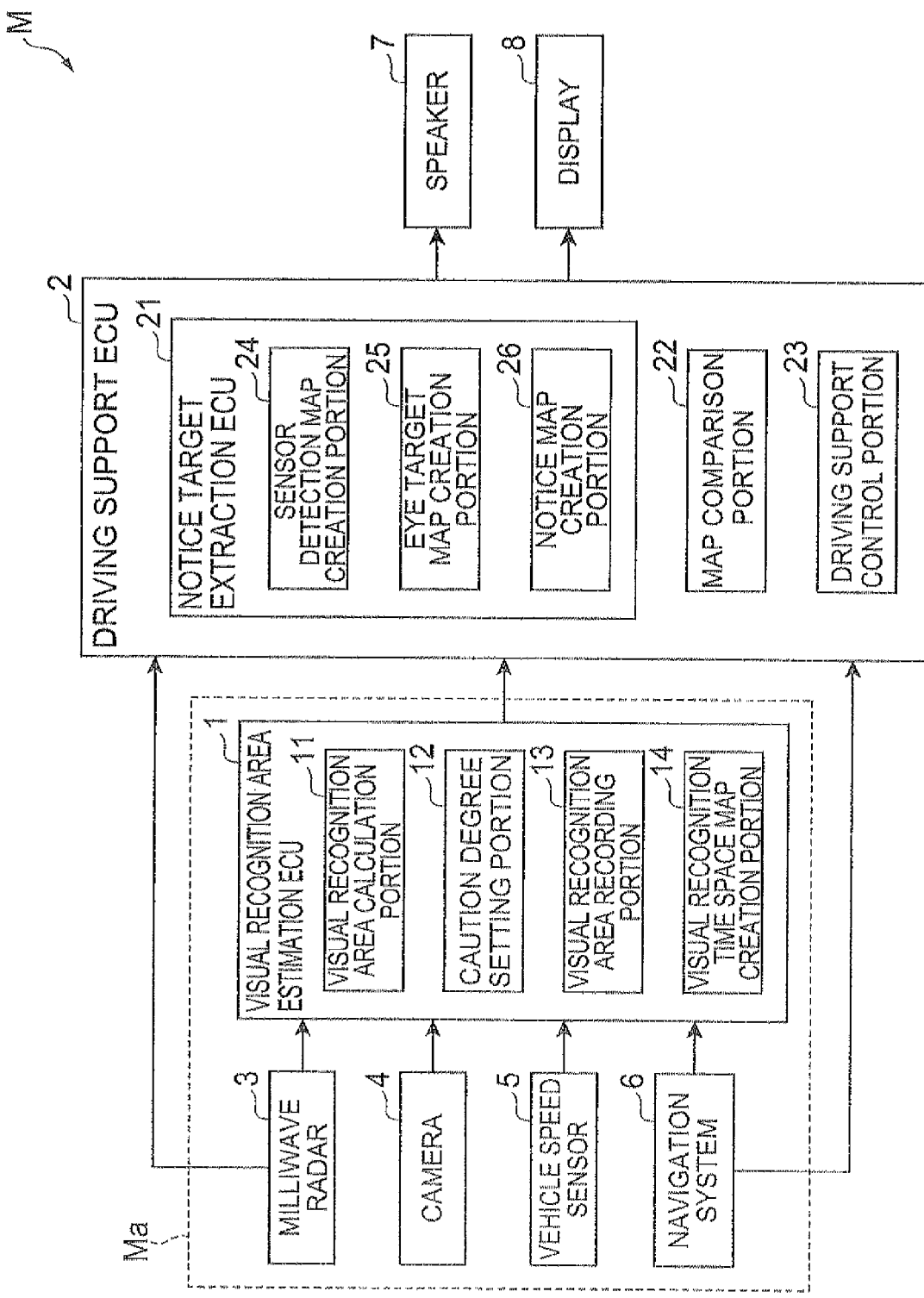
FIG. 1 is a block configuration diagram of a visual recognition area estimation device and a driving support device according to an embodiment of the present invention.

FIG. 1 is a block configuration diagram of a visual recognition area estimation device and a driving support device according to an embodiment of the present invention. A driving support device M shown in FIG. 1 is a device that is mounted on a subject vehicle and performs the driving support relative to a driver of the subject vehicle in a travelling environment of the subject vehicle. Furthermore, a visual recognition area estimation device Ma constituting a part of the driving support device M is a device that estimates an area recognized by a driver.

The driving support device M includes a visual recognition area estimation ECU (electronic control unit) 1, a driving support ECU 2, a milliwave radar 3, a camera 4, vehicle speed sensor 5, a navigation system 6, a speaker 7, and a display 8. Among them, the visual recognition area estimation ECU 1, the milliwave radar 3, the camera 4, the vehicle speed sensor 5, and the navigation system 6 constitute the visual recognition area estimation device Ma. In the following description, the milliwave radar 3, the camera 4, the vehicle speed sensor 5 and the navigation system 6 are generically also called "sensors".

Firstly, the respective components of the visual recognition area estimation device Ma will be described. The visual recognition area estimation ECU 1 is constituted by a computer that includes a CPU (Central Processing Unit), a ROM (Read Only Memory), a RAM (Random Access Memory) and the like. The visual recognition area estimation ECU 1 performs a predetermined processing based on an image signal, a position signal or the like to be output from the sensors and creates a visual recognition time space map. The visual recognition time space map is a map that estimates a time series visual recognition area as an area which is currently recognized by a driver.

The visual recognition area estimation ECU 1 includes a visual recognition area calculation portion 11, a caution degree setting portion 12, a visual recognition area recording portion 13, and a visual recognition time space map creation portion 14.

The visual recognition area calculation portion 11 is a portion that calculates a visual recognition area recognized by a driver in a certain time, based on an image signal or a position signal output from the sensors. The calculation of the visual recognition area by the visual recognition area calculation portion 11 is performed for each predetermined time. Although the visual recognition area calculation portion 11 includes components shown in FIG. 2, the components will be described later. The visual recognition area calculation portion 11 corresponds to visual recognition area calculation means.

The caution degree setting portion 12 shown in FIG. 1 is a portion that sets a degree of caution of a driver, for each of the plurality of visual recognition areas which are calculated for each predetermined time by the visual recognition area calculation portion 11. The degree of caution shows a degree of caution of a driver in the visual recognition area. The caution degree setting portion 12 sets the degree of caution in connection with each coordinate in each visual recognition area. Furthermore, the caution degree setting portion 12 stores the weighting coefficients used in the renewal of the degree of caution. The weighting coefficients are numerical values that are equal to or greater than 0 and equal to or less than 1. The caution degree setting portion 12 renews the degree of caution by multiplying the weighting coefficients for the degree of caution with respect to the visual recognition area calculated from the past to the present for a predetermined time whenever the visual recognition area is newly calculated. The caution degree setting portion 12 renews the degree of caution such that the degree of caution is set smaller as the time of the driver recognizing the visual recognition area becomes older. The caution degree setting portion 12 corresponds to caution degree setting means.

The visual recognition area recording portion 13 is a portion that sequentially records the visual recognition areas calculated for each predetermined time by the visual recognition area calculation portion 11 and the degrees of caution which are set or renewed for each visual recognition area by the caution degree setting portion 12. In the visual recognition area recording portion 13, a predetermined threshold value is stored which becomes a decision standard as to whether or not the coordinates within the visual recognition area with the renewed degree of caution are recorded. The visual recognition area recording portion 13 decides whether or not the visual recognition area is renewed within a predetermined time. Furthermore, the visual recognition area recording portion 13 decides whether or not the degree of caution renewed by the caution degree setting portion 12 along with the renewal of the visual recognition area is lower than the threshold value. Moreover, the visual recognition area recording portion 13 records the coordinates within the visual recognition area unchanged, or removes them, depending on the decision result.

The visual recognition time space map creation portion 14 is a portion that creates a visual recognition time space map, based on the visual recognition area calculated by the visual recognition area calculation portion 11, the respective past visual recognition areas recorded by the visual recognition area recording portion 13, and the degree of caution. The visual recognition area recording portion 13 creates the visual recognition time space map by composing the visual recognition area and the degree of caution. Furthermore, when the visual recognition area is newly calculated and the degree of caution is renewed, the visual recognition area recording portion 13 creates a new visual recognition time space map based on the visual recognition area and the degree of caution after the renewal. The visual recognition time space map creation portion 14 outputs the created visual recognition time space map to the driving support ECU 2. The visual recognition time space map creation portion 14 corresponds to time series visual recognition area estimation means.

The milliwave radar 3 detects an obstacle existing around a subject vehicle. The milliwave radar 3 scans the milliwave in a predetermined range of the front, the left and right sides, and the rear of a subject vehicle and receives the reflected waves thereof, thereby detecting the distance from the subject vehicle to the obstacle, the direction of the obstacle based on the subject vehicle, and the relative speed of the obstacle relative to the subject vehicle. The detection of the obstacle by the milliwave radar 3 is performed for each predetermined time. The milliwave radar 3 creates obstacle detection signals which show the detected distance, direction and relative speed, and outputs the created obstacle detection signals to the visual recognition area estimation ECU 1. Furthermore, the milliwave radar 3 also outputs the created obstacle detection signals to the driving support ECU 2.

The camera 4 images a driver of the subject vehicle. The camera 4 is attached to the front of a vehicle interior and images a face of a driver, particularly, the range including both eyes. The imaging of a driver by the camera 4 is performed for each predetermined time. The camera 4 creates the image signal showing the imaged image and outputs the created image signal to the visual recognition area estimation ECU 1.

The vehicle speed sensors 5 detect the vehicle speed of the subject vehicle. The vehicle speed sensors 5 are each provided in four wheels of the subject vehicle to detect the rotation speeds of the respective vehicle wheels. Furthermore, the vehicle speed sensors 5 detect the vehicle speed of the vehicle based on the rotation speeds of the respective vehicle wheels, create the vehicle speed signals showing the detection vehicle speeds, and output the created vehicle speed signals to the visual recognition area estimation ECU 1.

The navigation system 6 includes a map database, a GPS (Global Positioning System) receiver, input and output devices or the like. The navigation system 6 detects the positions of the subject vehicle by means of the map database or the GPS receiver. The detection of the position by the navigation system 6 is performed for each visual recognition area for a predetermined time. Upon detecting the position of the subject vehicle, the navigation system 6 creates the position signal showing the position of the detected subject vehicle and outputs the signal to the ECU 1. Furthermore, the navigation system 6 also outputs the created position signal to the driving support ECU 2.

Figure 2:
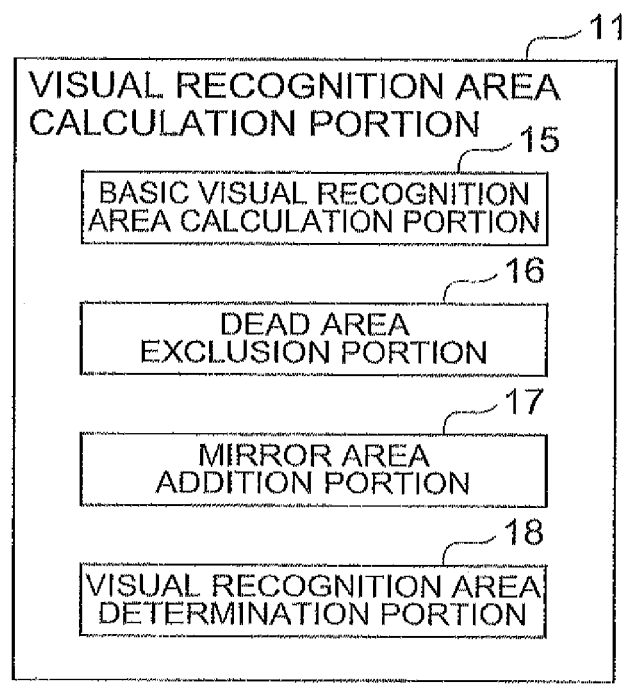
FIG. 2 is a block configuration diagram of a visual recognition area calculation portion in FIG. 1.

Next, each component included in the visual recognition area calculation portion 11 will be described. As shown in FIG. 2, the visual recognition area calculation portion 11 includes a basic visual recognition area calculation portion 15, a dead area exclusion portion 16, a mirror area addition portion 17, and a visual recognition area determination portion 18.

The basic visual recognition area calculation portion 15 is a portion that calculates a basic visual recognition area to be set based on the direction of eyes of a driver. The basic visual recognition area calculation portion 15 acquires an image signal to be output from the camera 4, a vehicle speed signal to be output from the vehicle speed sensor 5, and a position signal to be output from the navigation system 6, and stores the signals in order. Furthermore, the basic visual recognition area calculation portion 15 calculates the direction of eyes of a driver by performing the image processing on the required image signal. Furthermore, the basic visual recognition area calculation portion 15 decides whether or not the image signal from the camera 4 and the position signal from the navigation system 6 are renewed within a predetermined time. In addition, when deciding that any one of the position of the subject vehicle and the calculated direction of eyes is renewed, the basic visual recognition area calculation portion 15 decides the position of the subject vehicle which becomes the standard of the basic visual recognition area calculation.

An effective viewing angle and a range of a driver depending on the vehicle speed of the subject vehicle are stored in the basic visual recognition area calculation portion 15. The basic visual recognition area calculation portion 15 calculates the effective viewing angle and the range corresponding to the vehicle speed shown in the vehicle speed signal. In addition, the basic visual recognition area calculation portion 15 calculates the basic visual recognition area by composing the calculated direction of eyes, the effective viewing angle, the range, and the position of the subject vehicle shown in the position signal. The basic visual recognition area calculation portion 15 corresponds to the basic visual recognition area calculation means. In addition, the basic visual recognition area calculation portion 15 may store a center viewing angle depending on the vehicle speed of the subject vehicle and calculate the basic visual recognition area using the center viewing angle and the range.

The dead area exclusion portion 16 is a portion that estimates the dead area of a driver generated by obstacles existing in the basic visual recognition area and excludes the dead area from the basic visual recognition area. The dead area exclusion portion 16 acquires the obstacle detection signal to be output from the milliwave radar 3 and the position signal to be output from the navigation system 6 and stores the signals in order. The dead area exclusion portion 16 decides whether or not the obstacle detection signal from the milliwave radar 3 is renewed within a predetermined time. Furthermore, when deciding that the obstacle detection signal is renewed within a predetermined time, the dead area exclusion portion 16 decides whether or not the position of the obstacle shown in the obstacle detection signal is situated outside the basic visual recognition area calculated by the basic visual recognition area calculation portion 15.

When deciding that the position of the obstacle does not exist except for the basic visual recognition area, the dead area exclusion portion 16 calculates the dead area of a driver by combining the distance up to the obstacle and the direction of the obstacle shown in the obstacle detection signal, and the position of the subject vehicle shown in the acquired position signal. In addition, the dead area exclusion portion 16 calculates the dead angle exclusion visual recognition area by excluding the dead area from the basic visual recognition area. The dead angle exclusion visual recognition area thus calculated is an area where the dead area, which is actually not recognizable by a driver, is excluded. The dead area exclusion portion 16 corresponds to a dead area exclusion means.

The mirror area addition portion 17 is a portion that estimates the mirror area recognizable by a driver via mirrors and adds a mirror area to the basic visual recognition area. Herein, the mirrors are left and right door mirrors, a fender mirror, a room mirror or the like. The mirror area addition portion 17 stores the directions of views of a driver calculated by the basic visual recognition area calculation portion 15 in order. Furthermore, the positions of the mirrors based on the subject vehicle are stored in the mirror area addition portion 17. The mirror area addition portion 17 decides whether or not the mirrors exist in the direction of eyes of a driver based on the direction of eyes of a driver calculated by the basic visual recognition area calculation portion 15 and the positions of the stored mirrors. When it is decided that the mirror exists in the direction of eyes of a driver, the mirror area addition portion 17 calculates an area reflected in the mirror as the mirror area, based on the direction of eyes and the position of the mirror.

In addition, the mirror area addition portion 17 calculates a mirror addition visual recognition area by adding the mirror area to the basic visual recognition area calculated by the basic visual recognition area calculation portion 15 or the dead angle exclusion visual recognition area calculated by the dead area exclusion portion 16. The mirror addition visual recognition area thus calculated is an area where the area indirectly recognizable by a driver via the mirror is included. The mirror area addition portion 17 corresponds to the mirror area addition means. In addition, the mirror area addition portion 17 may acquire angle information from a mirror angle adjustment device and calculate the mirror area by taking into account the angle information.

The visual recognition area determination portion 18 is a portion that determines the visual recognition area. The visual recognition area determination portion 18 determines the basic visual recognition area, the dead angle exclusion visual recognition area or the mirror addition visual recognition area as the visual recognition area, based on the renewal decision result of the obstacle detection signal by the dead area exclusion portion 16 or a decision result of a mirror existence decision in the direction of eyes by the mirror area addition portion 17. The visual recognition area determined by the visual recognition area determination portion 18 becomes a visual recognition area calculated in the visual recognition area calculation portion 11.

Subsequently to each component of the visual recognition area estimation device Ma described above, other components constituting the driving support device M will be described.

Similarly to the visual recognition area estimation ECU 1, the driving support ECU 2 is constituted by a computer including a CPU, a ROM, a RAM or the like. The driving support ECU 2 controls the driving support relative to a driver of the subject vehicle by performing a predetermined processing based on the obstacle detection signal to be output from the milliwave radar 3, the position signal to be output from the navigation system 6, and the visual recognition time space map to be output from the visual recognition area estimation ECU 1.

The driving support ECU 2 includes a notice target extraction ECU 21, a map comparison portion 22, and a driving support control portion 23. The notice target extraction ECU 21 creates a sensor detection map, an eye target map, and a notice target extraction map by performing a predetermined processing based on the obstacle detection signal, the position signal, and the visual recognition time space map. The sensor detection map, the eye target map, and the notice target extraction map will be described later.

The notice target extraction ECU 21 includes a sensor detection map creation portion 24, an eye target map creation portion 25, and a notice target creation portion 26.

The sensor detection map creation portion 24 is a portion that creates the sensor detection map based on the obstacle detection signal to be output from the milliwave radar 3 and the position signal to be output from the navigation system 6. The sensor detection map creation portion 24 acquires the obstacle detection signal and the position signal. The sensor detection map creation portion 24 calculates the relative speed of the subject vehicle and the obstacle shown in the obstacle detection signal in regard to each of the obstacles detected by the milliwave radar 3. Furthermore, the sensor detection map creation portion 24 calculates a time (referred to as TTC (Time To Collision) in the following description) to the collision relative to each obstacle based on the calculated relative speed.

Furthermore, a threshold value of TTC is stored in the sensor detection map creation portion 24. The sensor detection map creation portion 24 extracts the obstacle having a TTC equal to or lower than the threshold value by the comparison of the TTC calculated for each obstacle with the threshold value. In addition, the sensor detection map creation portion 24 calculates the position of the extracted obstacle, based on the distance to the obstacle and the direction of the obstacle shown in the acquired obstacle detection signal and the position of the subject vehicle shown in the acquired position signal.

Furthermore, the sensor detection map creation portion 24 performs the extraction of the obstacle for each predetermined time and stores the positions of each obstacle in time series for each direction where the extracted obstacle is situated. In this manner, the sensor detection map creation portion 24 creates the sensor detection map. Furthermore, the sensor detection map creation portion 24 renews the sensor detection map in order by performing such a processing for each predetermined time. The sensor detection map is a map in which the obstacle to be observed by a driver is extracted among the obstacles that are detected by the milliwave radar 3 around the subject vehicle.

The eye target map creation portion 25 is a portion that creates the eye target map based on the visual recognition time space map to be output from the visual recognition area recording portion 13 of the visual recognition area estimation ECU 1 and the sensor detection map to be created by the sensor detection map creation portion 24. The eye target map creation portion 25 acquires the visual recognition time space map to be output from the visual recognition area estimation ECU 1. Furthermore, the eye target map creation portion 25 extracts the obstacle situated within the time series visual recognition area shown in the acquired visual recognition time space map among the obstacles stored in the sensor detection map.

Furthermore, the eye target map creation portion 25 performs the extraction of the obstacle for each predetermined time and stores the positions of each obstacle in time series for each direction where the extracted obstacle is situated. In this manner, the eye target map creation portion 25 creates the eye target map. Furthermore, the eye target map creation portion 25 renews the eye target map in order by performing such a processing for each predetermined time. The eye target map is a map that shows the obstacle included in the area which is currently recognized by a driver among the obstacles that need to be observed by a driver around a subject vehicle.

The notice map creation portion 26 is a portion that creates the notice map based on the sensor detection map created by the sensor detection map creation portion 24. The notice map creation portion 26 stores the oldest position and the newest position in the detection time in regard to the obstacles which are stored in the sensor detection map and are consecutively detected. Furthermore, the notice map creation portion 26 calculates and stores a prediction position of the obstacle which is detected in the sensor detection map at a certain time and is not detected in the sensor detection map renewed after a predetermined time elapses from that time.

Furthermore, the notice map creation portion 26 stores the positions and the prediction positions of each obstacle in time series for each predetermined time and for each direction where the obstacles are situated. In this manner, the notice map creation portion 26 creates the notice map. Furthermore, the notice map creation portion 26 renews the eye target map in order by performing such a processing for each predetermined time. The notice target extraction map is a map in which the target which is the minimum that needs to be brought to the notice of the driver in the driving environment of a subject vehicle is extracted as an observation point. The notice map creation portion 26 corresponds to observation point extraction means.

The map comparison portion 22 is a portion that detects the obstacles that need to be a driving support target by comparing the eye target map created by the eye target map creation portion 25 with the notice map created by the notice map creation portion 26. The map comparison portion 22 detects the obstacle, which is not included in the eye target map among the obstacles stored in the notice target extraction map, as an overlooked obstacle. In other words, the map comparison portion 22 detects the observation point which is not included in the time series visual recognition area among the observation points extracted in the notice target extraction map. The map comparison portion 22 corresponds to caution state determination means that determines the caution state of a driver relative to the observation point.

The driving support control portion 23 is a portion that controls the driving support so as to suggest information regarding the overlooked obstacle detected by the driving support control portion 23. The driving support control portion 23 creates the driving support signal including the position of the overlooked obstacle and the like and outputs the created driving support signal to the speaker 7 and the display 8.

The speaker 7 is a vehicle speaker that outputs a predetermined sound to a driver based on the driving support signal output from the driving support control portion 23 of the driving support ECU 2. Furthermore, the display 8 is a vehicle display that displays a predetermined image to a driver based on the driving support signal output from the driving support control portion 23 of the driving support ECU 2. The speaker 7 and the display 8 acquire the driving support signal and report the position of the overlooked obstacle and the like shown in the acquired driving support signal to a driver by means of the sound and the image.

Figure 3:
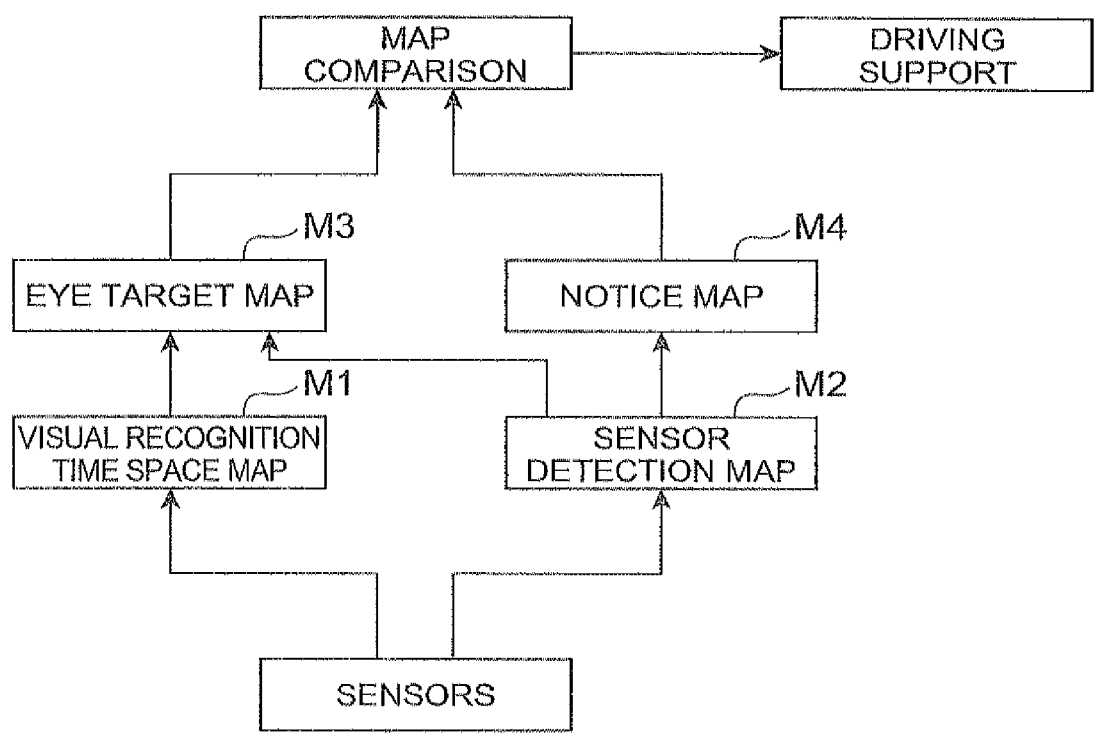
FIG. 3 is an explanation diagram of a driving support by a driving support device.

The relationship between each map created by the configuration of the driving support device M and the visual recognition area estimation device Ma described above and the driving support using the created map is as shown in FIG. 3. As shown in FIG. 3, a visual recognition time space map M1 and a sensor detection map M2 are created based on each signal to be output from the sensors. Furthermore, an eye target map M3 is created based on the visual recognition time space map M1 and the sensor detection map M2. In addition, a notice map M4 is created based on the sensor detection map M2. Moreover, the driving support is performed by the comparison of the eye target map M3 with the notice map M4.

Figure 4:
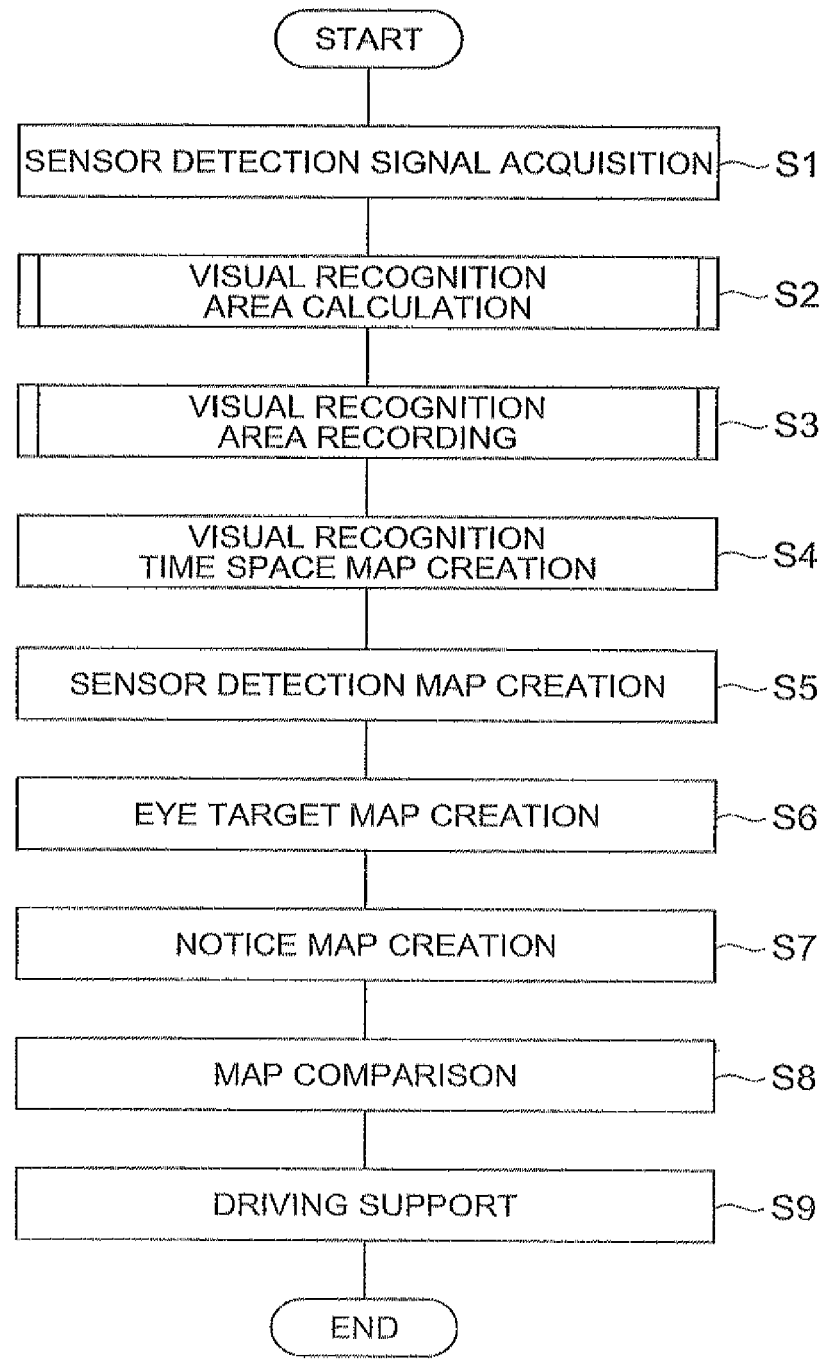
FIG. 4 is a flow chart that shows a processing sequence by the driving support device.

Next, the operation of the driving support device M and the visual recognition area estimation device Ma will be described. FIG. 4 is a flow chart that shows a processing sequence by the driving support device M. The processing shown in FIG. 4 is repeatedly performed from the start of the engine of the subject vehicle to the stopping thereof.

Firstly, the visual recognition area estimation ECU 1 and the driving support ECU 2 acquire each signal to be output from the sensors (S1). Herein, the visual recognition area estimation ECU 1 acquires the obstacle detection signal from the milliwave radar 3, the image signal from the camera 4, the vehicle speed signal from the vehicle speed sensor 5, and the position signal from the navigation system 6 and stores the signals in order. Furthermore, the driving support ECU 2 acquires the obstacle detection from the milliwave radar 3 and the position signal from the navigation system 6 and stores the signals in order.

Figure 5:
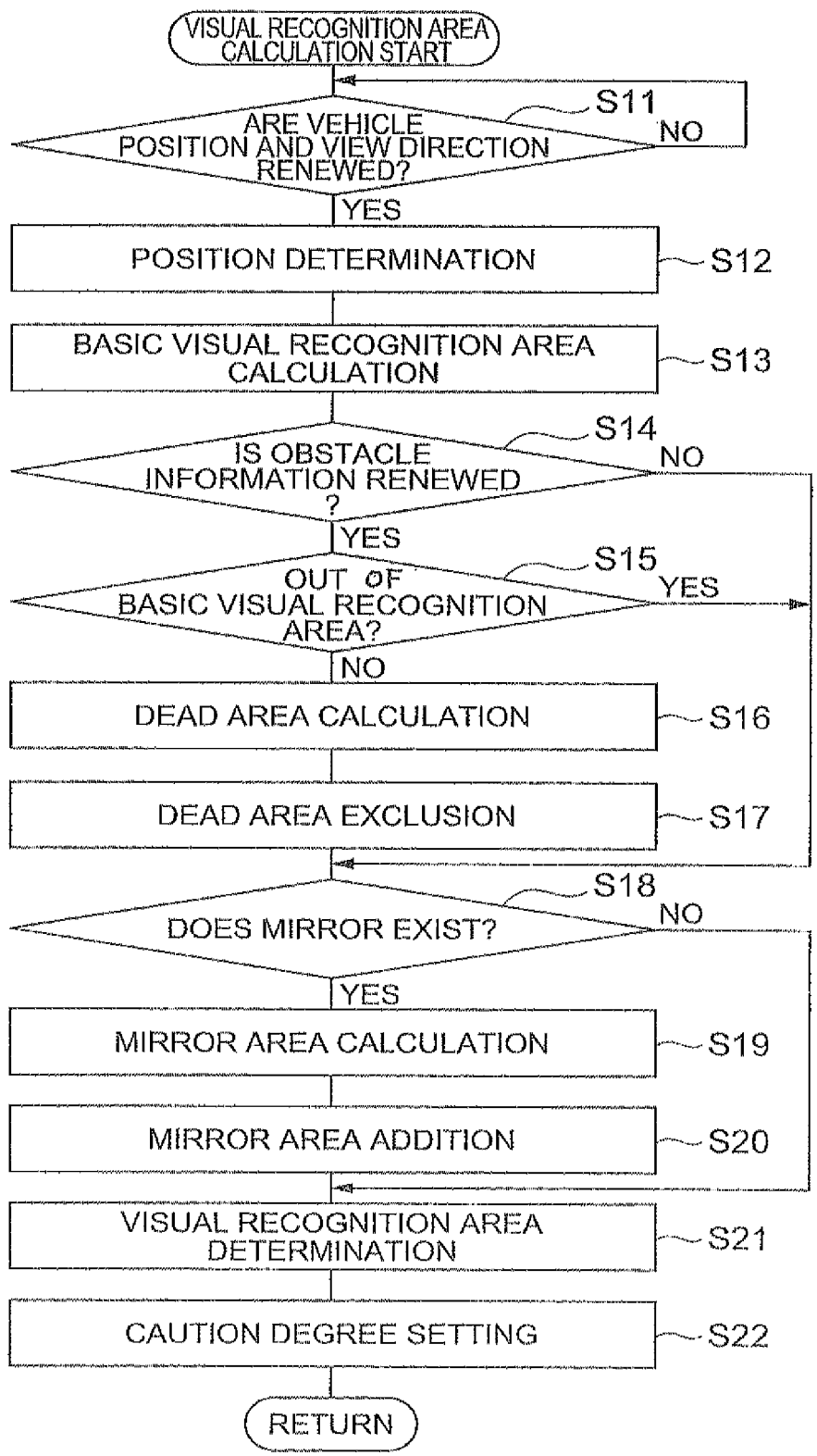
FIG. 5 is a flow chart that shows a part of the processing sequence shown in FIG. 4.

Next, the visual recognition area estimation ECU 1 calculates the visual recognition area (S2). The calculation processing of the visual recognition area in the visual recognition area estimation ECU 1 is performed mainly by the visual recognition area calculation portion 11 depending on the flow chart shown in FIG. 5. Firstly, the basic visual recognition area calculation portion 15 decides whether or not the image signal and the position signal are renewed within a predetermined time (S11). Herein, the basic visual recognition area calculation portion 15 performs the decision by detecting whether or not the image signal and the position signal newly stored within a predetermined time exist. The basic visual recognition area calculation portion 15 repeats the decision when deciding that all of the image signal and the position signal are not renewed within a predetermined time.

Figure 6:
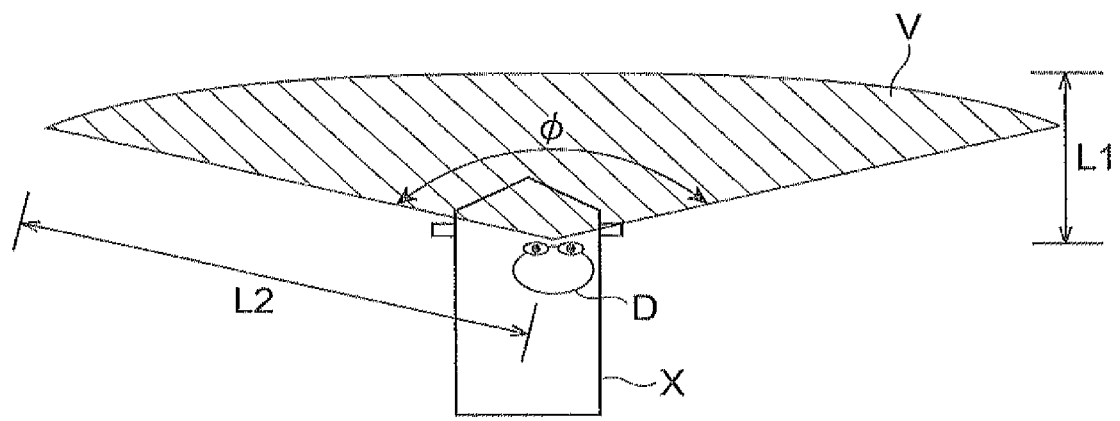
FIG. 6 is an explanation diagram of a basic visual recognition area calculation in the processing of FIG. 5.

The basic visual recognition area calculation portion 15 determines the position of the subject vehicle when deciding that at least one of the image signal and the position signal is renewed within a predetermined time (S12). Furthermore, the basic visual recognition area calculation portion 15 calculates the direction of eyes of a driver by performing the image processing on the acquired image signal. Next, the basic visual recognition area calculation portion 15 calculates the basic visual recognition area (S13). Herein, as shown in FIG. 6, the basic visual recognition area calculation portion 15 calculates an effective viewing angle $\phi$ and ranges L1 and L2 corresponding to the vehicle speed shown in the acquired vehicle speed. In addition, the basic visual recognition area calculation portion 15 calculates a basic visual recognition area V by composing the calculated direction of eyes of the driver D, the effective viewing angle $\phi$, the ranges L1 and L2 and the position of the subject vehicle determined in the step S12.

Next, the dead area exclusion portion 16 decides whether or not the obstacle detection signal is renewed within a predetermined time (S14). Herein, the dead area exclusion portion 16 performs the decision by detecting whether or not there is an obstacle detection signal newly stored within a predetermined time. The dead area exclusion portion 16 decides whether or not the position of the obstacle shown in the obstacle detection signal is out of the basic visual recognition area V calculated in the step S13 when deciding that the obstacle detection signal is renewed within a predetermined time (S15).

Figure 7:
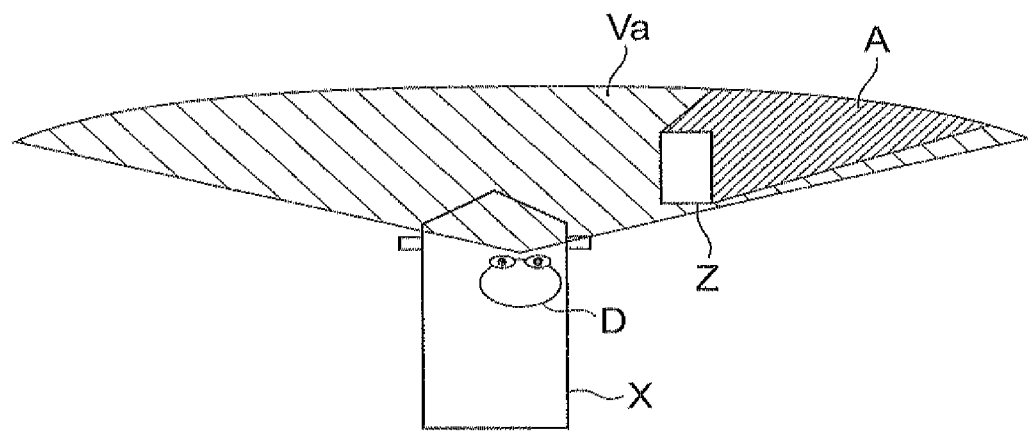
FIG. 7 is an explanation diagram of dead area exclusion in the processing of FIG. 5.

In the decision of step S15, as shown in FIG. 7, when the position of the obstacle Z is in the basic visual recognition area, the dead area exclusion portion 16 decides that the position of the obstacle is not out of the basic visual recognition area and calculates the dead area (S16). Herein, the dead area exclusion portion 16 calculates the dead area A of the driver D by combining the distance to the obstacle Z and the direction of the obstacle shown in the obstacle detection signal and the position of the subject vehicle X shown in the acquired position signal.

Next, the dead area exclusion portion 16 excludes the dead area from the basic visual recognition area (S17). Herein, the dead area exclusion portion 16 excludes the dead area A shown in FIG. 7 from the basic visual recognition area V shown in FIG. 6. Furthermore, the dead area exclusion portion 16 calculates the dead angle exclusion visual recognition area Va by the exclusion of the dead area A. Meanwhile, when it is decided that the obstacle detection signal is not renewed within a predetermined time in the step S14, or when it is decided that the position of the obstacle is out of the basic visual recognition area in the step S15, the exclusion of the dead area by the dead area exclusion portion 16 is not performed and the process is shifted to step S18.

Figure 8:
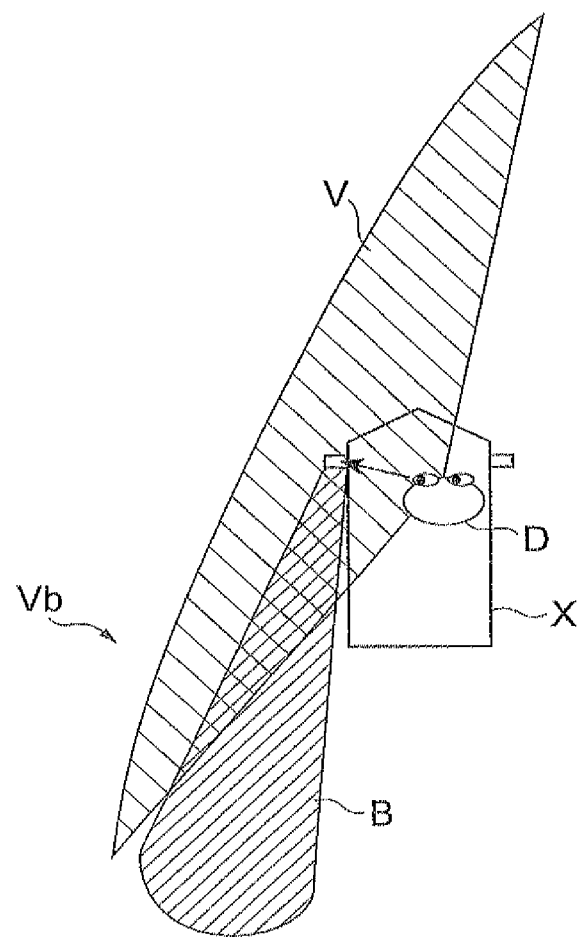
FIG. 8 is an explanation diagram of a mirror area addition in the processing of FIG. 5.

Next, the mirror area addition portion 17 decides whether or not the mirror exists in the direction of eyes of a driver (S18). Herein, the mirror area addition portion 17 performs the decision by detecting whether or not the stored position of the mirror exists in the direction of eyes of a driver calculated by the basic visual recognition area calculation portion 15. Herein, as shown in FIG. 8, when a left door mirror exists in the direction of eyes of the driver D, the mirror area addition portion 17 decides that the mirror exists in the direction of eyes of the driver and calculates the mirror area (S19). Herein, the mirror area addition portion 17 calculates the area reflected in the mirror as a mirror area B based on the direction of eyes and the position of the mirror.

Next, the mirror area addition portion 17 adds the mirror area (S20). Herein, the mirror area B is added to the dead angle exclusion visual recognition area Va calculated in the step S17 or the basic visual recognition area V calculated in the step S13. Furthermore, the mirror area addition portion 17 calculates a mirror addition visual recognition area Vb by the addition of the mirror area B. Meanwhile, when it is decided that the mirror does not exist in the direction of eyes of the driver in the step S18, the addition of the mirror area by the mirror area addition portion 17 is not performed and the process is shifted to step S21.

Next, the visual recognition area determination portion 18 determines the visual recognition area (S21). Herein, the visual recognition area determination portion 18 determines the mirror addition visual recognition area Vb calculated in the step S20, the dead angle exclusion visual recognition area Va calculated in the step S17, or the basic visual recognition area V calculated in the step S13 as the visual recognition area. The visual recognition area determined in the step S21 becomes a visual recognition area calculated in the visual recognition area calculation portion 11 shown in FIG. 1.

Next, the caution degree setting portion 12 sets the degree of caution of the driver to the visual recognition area calculated in steps S11 to S21 (S22). Herein, the caution degree setting portion 12 sets the degree of caution in connection with each coordinate within the visual recognition area. The caution degree setting portion 12 sets a fixed value of degree of caution "a" to the visual recognition area. In addition, depending on the positions within the visual recognition area, a degree of caution "b" may be set to the coordinate situated within the center viewing angle, and a degree of caution "c" lower than the degree of caution "b" may be set to the coordinate situated in the surrounding viewing angle. In this manner, by changing the caution degree depending on the positions within the visual recognition area, it can be assumed that the caution state of the driver to the area of the center viewing angle is relatively higher than the caution state of the driver to the area of the surrounding viewing angle.

Figure 9:
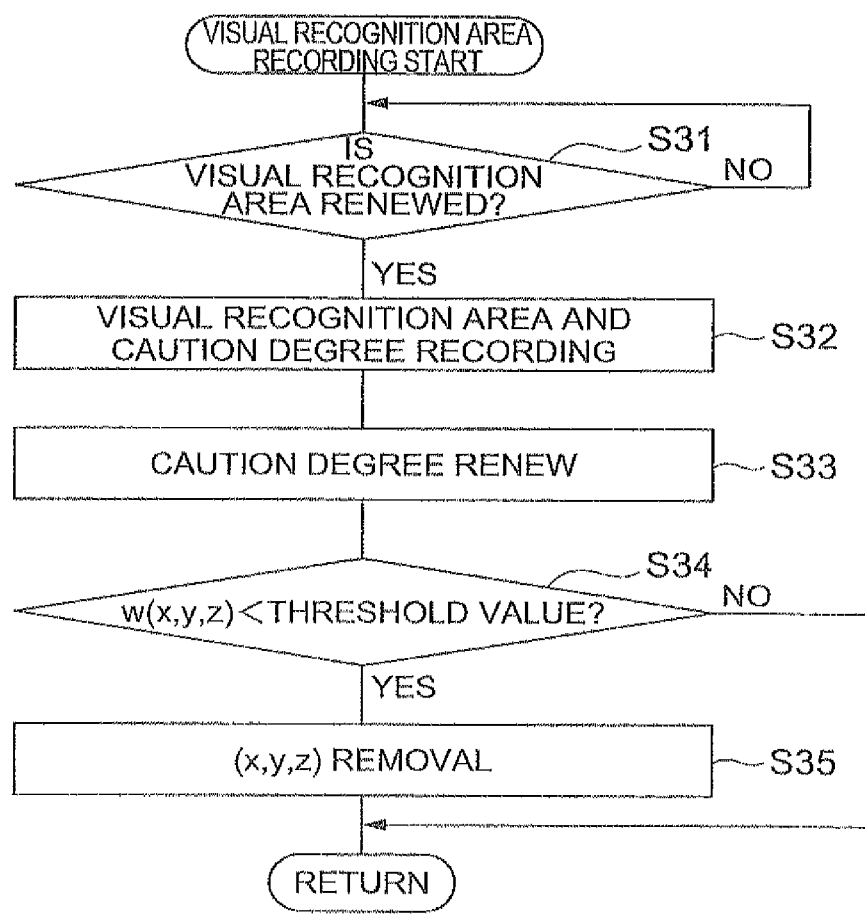
FIG. 9 is a flow chart that shows a part of the processing sequence shown in FIG. 4.

When the visual recognition area is calculated by the processing of steps S11 to S22, returning to the flow chart of FIG. 4, the visual recognition area estimation ECU 1 records the visual recognition area (S3). The recording processing of the visual recognition area in the visual recognition area estimation ECU 1 is carried out depending on the flow chart shown in FIG. 9 by means of the caution degree setting portion 12 and the visual recognition area recording portion 13. Firstly, the visual recognition area recording portion decides whether or not the visual recognition area is renewed within a predetermined time. (S31). Herein, the visual recognition area recording portion 13 performs the decision by detecting whether or not there is a visual recognition area newly recorded within a predetermined time. The visual recognition area recording portion 13 repeats the decision when deciding that the visual recognition area is not renewed within a predetermined time.

The visual recognition area recording portion 13 records the renewed visual recognition area and the degree of caution which is set to the visual recognition area when deciding that visual recognition area is renewed within a predetermined time (S32). Next, the caution degree setting portion 12 renews the degree of caution (S33). Herein, the caution degree setting portion 12 renews the degree of caution to the coordinates within the respective visual recognition areas which is calculated from the past to the present for a predetermined time and recorded in the visual recognition area recording portion 13.

Figure 10:
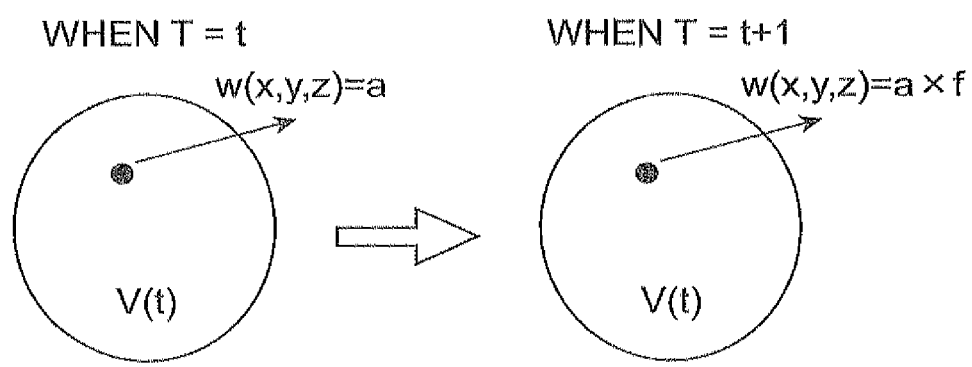
FIG. 10 is an explanation diagram of a degree of caution renewal in the processing in FIG. 9.

The renewal of degree of caution in step S33 will be described with reference to FIGS. 10 and 11. In FIG. 10, a visual recognition area V (t) indicates the visual recognition area and the degree of caution in a time T=t. Furthermore, w (x, y, z) indicates a degree of caution in a coordinate (x, y, z) within the visual recognition area V (t). Herein, the caution degree setting portion 12 renews the degree of caution by multiplying a weighting coefficient f by the visual recognition area V (t) having the degree of caution w (x, y, z)=a at the time T=t to calculate the degree of caution w (x, y, z)=a×f.

As shown in FIG. 11, the weighting coefficient f stored in the caution degree setting portion 12 becomes smaller as the time of the driver recognizing the visual recognition area becomes older. For example, as shown in FIG. 11A, the greater a difference from the time T is, the smaller the weighting coefficient f is. In FIG. 11A, the weighting coefficient f is reduced in proportion to the difference from the time T. For that reason, in the visual recognition area at the time T=t0, in the visual recognition area, the weighting coefficient f becomes zero. Further, as shown in FIG. 11B, the weighting coefficient f has a high reduction rate when the difference from the time T is small, and the larger the difference from the time T, the smaller the reduction rate is, and the reduction rate may gradually become zero.

Returning to FIG. 9, the visual recognition area recording portion 13 decides whether or not the degree of caution renewed by the caution degree setting portion 12 in the step S33 is lower than the threshold value (S34). Herein, the visual recognition area recording portion 13 performs the decision by detecting whether the degree of caution w (x, y, z) is lower than the threshold value in regard to the coordinate (x, y, z) within the respective visual recognition areas recorded from the past to the present for a predetermined time. The visual recognition area recording portion 13 removes the coordinate (x, y, z) when deciding that the coordinate (x, y, z) is lower than the threshold value of the degree of caution (S35). Meanwhile, the visual recognition area recording portion 13 records the coordinate (x, y, z) as it is without removal thereof when deciding that the coordinate (x, y, z) is equal to or greater than the threshold value of the degree of caution.

When the visual recognition area is recorded by the processing of steps S31 to S35, returning to the flow chart of FIG. 4, the visual recognition time space map creation portion 14 of the visual recognition area estimation ECU 1 creates the visual recognition time space map (S4). Herein, the visual recognition time space map creation portion 14 creates the visual recognition time space map by combining the visual recognition area calculated by the visual recognition area calculation portion 11, the respective past visual recognition areas recorded by the visual recognition area recording portion 13, and the degrees of caution thereof. Furthermore, the visual recognition time space map creation portion 14 outputs the created visual recognition time space map to the driving support ECU 2.

Figure 12:
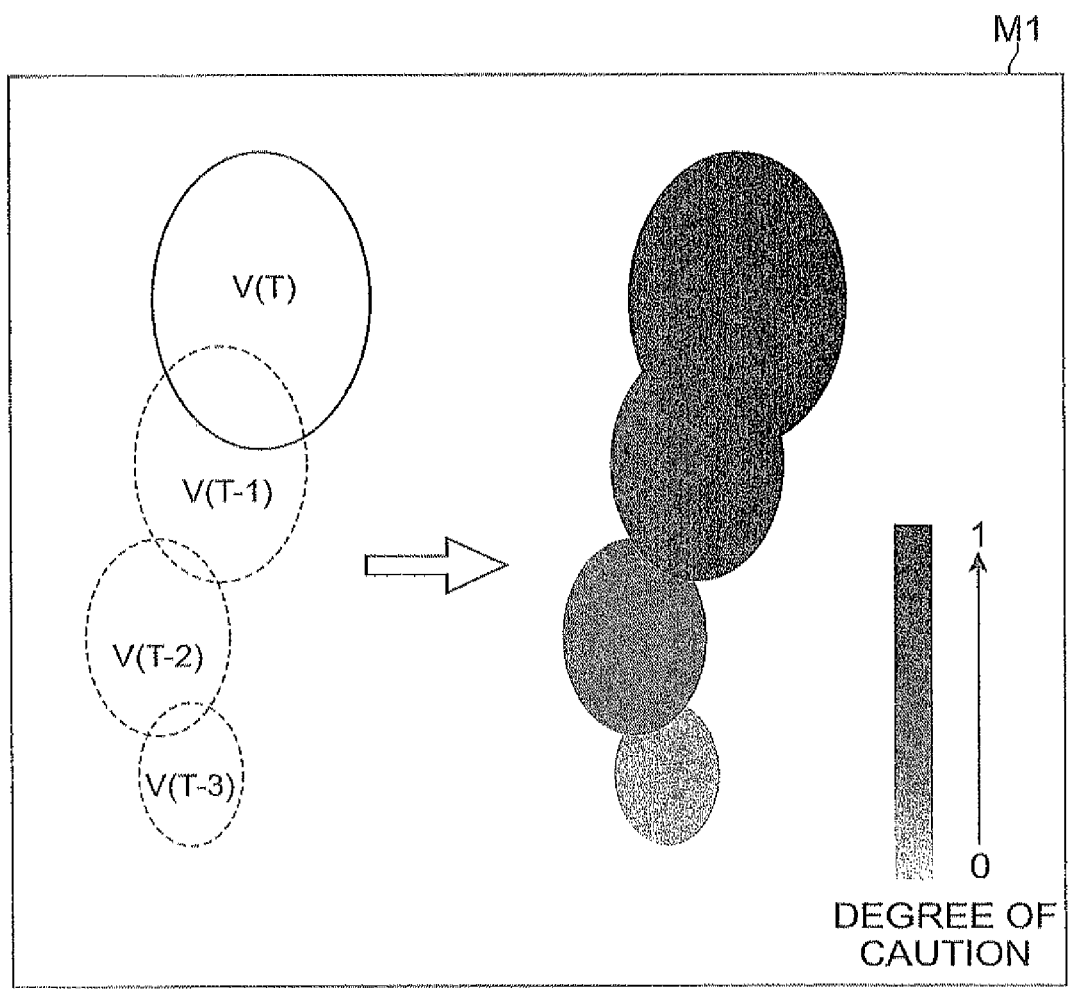
FIG. 12 is an explanation diagram of a visual recognition time space map created in the processing of FIG. 4.

FIG. 12 is an explanation diagram of a visual recognition time space map that is created in step S4. The visual recognition time space map creation portion 14 creates the visual recognition time space map M1 by combining a visual recognition area V (T) calculated by the visual recognition area calculation portion 11 and the past visual recognition areas V (T1), V (T2) and V (Ts) recorded by the visual recognition area recording portion 13. In FIG. 12, the size of the degree of caution in each visual recognition area is indicated by lightness of shading. As shown in FIG. 12, in the visual recognition time space map M1, as the time of the driver recognizing the visual recognition area becomes older, the visual recognition area is reduced, and the degree of caution is reduced. By means of the visual recognition time space map M1, the time series visual recognition area as the area currently recognized by the driver is estimated.

Next, the process is shifted to the processing by the driving support ECU 2, and the sensor detection map creation portion 24 of the notice target extraction ECU 21 creates the sensor detection map (S5). Herein, the sensor detection map creation portion 24 calculates the relative speed and a TTC for each obstacle detected by the milliwave radar 3, based on the obstacle detection signal and the position signal acquired from the sensors. Furthermore, the sensor detection map creation portion 24 extracts the obstacle having a TTC equal to or less than the threshold value by the comparison of the TTC calculated for each obstacle with the threshold value.

In addition, the sensor detection map creation portion 24 calculates the position of the extracted obstacle based on the distance to the obstacle and the direction of the obstacle shown in the acquired obstacle detection signal and the position of the subject vehicle shown in the acquired position signal. In addition, the sensor detection map creation portion 24 creates the sensor detection map by adding the position of the newly calculated obstacle to the sensor detection map stored in the past and storing the same.

Figure 13:
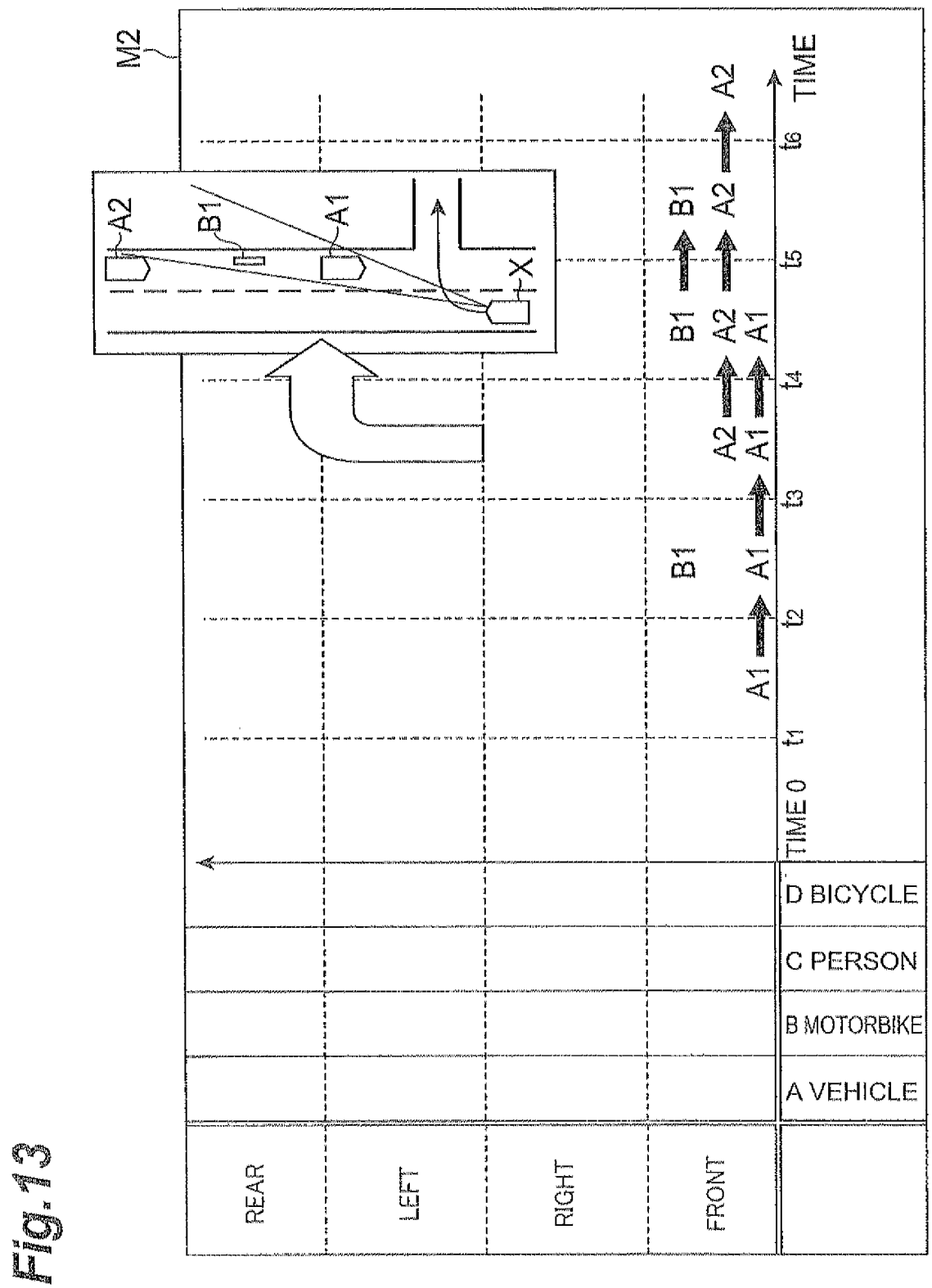
FIG. 13 is an explanation diagram of a sensor detection map created in the processing of FIG. 4.

FIG. 13 is an explanatory diagram of a sensor detection map created in step S5. As shown in the plan view of FIG. 13, the subject vehicle X tries to turn right at a T shape road. In the sensor detection map M2 shown in FIG. 13, the obstacle detected by the milliwave radar 3 in front of the subject vehicle X is shown in time series. For example, at times t1 to t5, other vehicle A1 detected in front of the subject vehicle X is consecutively shown. Furthermore, in times t2 to t3 and times t4 to t6, other vehicle B1, which is a motorbike detected in front of the subject vehicle X, is shown.

In this manner, in the sensor detection map M2, by storing obstacles having the TTC equal to or less than the threshold value, the obstacle that needs to be observed by the driver is extracted among the obstacles detected by the milliwave radar 3 around the subject vehicle. In addition, in FIG. 13, although only the obstacle detected in front of the subject vehicle X is shown, the obstacles detected at each of the left and right sides and the rear side of the subject vehicle X are also similarly stored in the sensor detection map M2.

Next, the eye target map creation portion 25 creates the eye target map (S6). Herein, the eye target map creation portion 25 acquires the visual recognition time space map that is output from the visual recognition time space map creation portion 14 of the visual recognition area estimation ECU 1. Furthermore, the eye target map creation portion 25 extracts the obstacle which is situated within the time series visual recognition area shown in the acquired visual recognition time space map, among the obstacles within the sensor detection map created in the step S5. In addition, the eye target map creation portion 25 creates the eye target map by adding the position of the newly extracted obstacle to the view target map stored in the past and storing the same.

Figure 14:
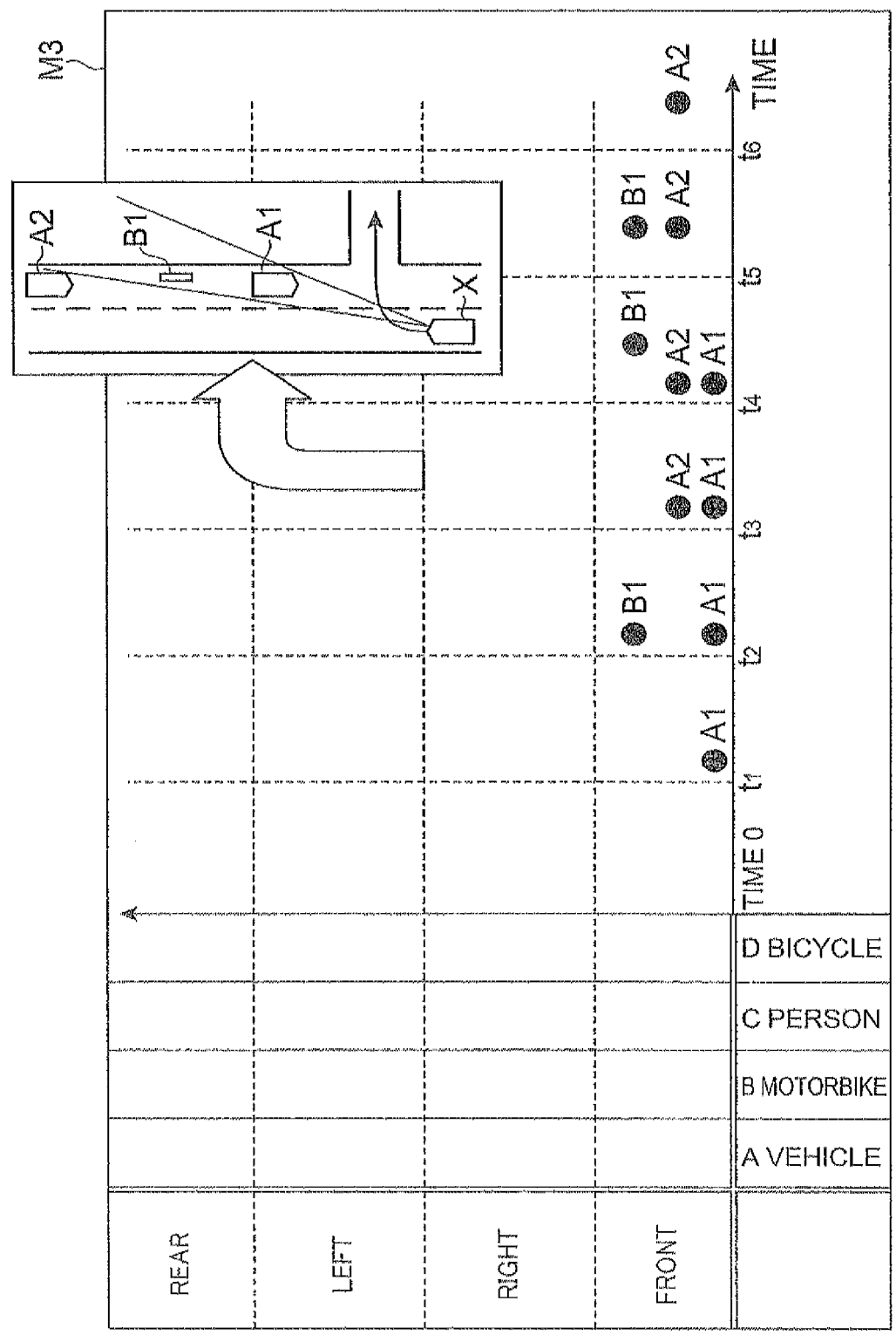
FIG. 14 is an explanation diagram of an eye target map created in the processing of FIG. 4.

FIG. 14 is an explanation diagram of a view target map which is created in step S6. In the eye target map M3, among the obstacles shown in the sensor detection map of FIG. 13, an obstacle situated within the time series visual recognition area is shown. In the eye target map M3 shown in FIG. 14, all other vehicles A1, A2 and B1, which are obstacles shown in the sensor detection map M2 are within the time series visual recognition area and are shown by black circles. The black circles show that the positions of the obstacles are stored in the sensor detection map M2. In this manner, in the eye target map M3, among the obstacles that needs to be observed by the driver around the subject vehicle X, the obstacle included in the currently recognized area is extracted.

Next, the notice map creation portion 26 creates the notice map (S7). Herein, the notice map creation portion 26 stores the oldest detected position and the newest detected position in regard to the obstacles that are stored in the sensor detection map created in step S5 and are consecutively detected. Furthermore, the notice map creation portion 26 calculates and stores the prediction position of the obstacle which is detected in the sensor detection map at a certain time and is not detected in the sensor detection map renewed after a predetermined time elapses from that time. In addition, the notice map creation portion 26 creates the notice map by adding the position of the newly stored obstacle to the notice map stored in the past and storing the same.

Figure 15:
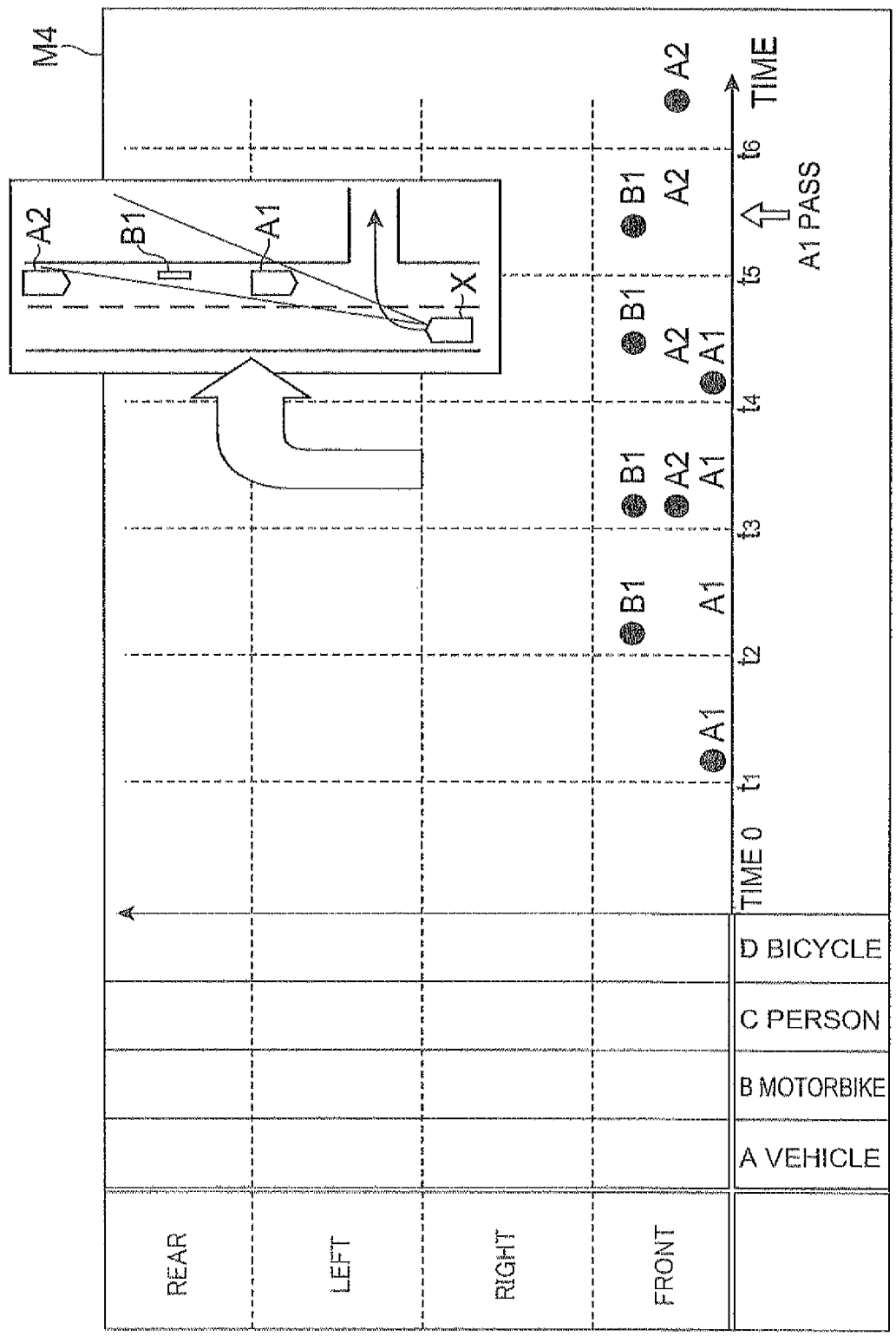
FIG. 15 is an explanation diagram of a notice map created in the processing of FIG. 4.

FIG. 15 is an explanation diagram of a notice map that is created in step S7. In the notice map M4, among other vehicle A1 consecutively detected at times t1 to t5 in the sensor detection map M2, only other vehicle A1 shown at the times t1 to t2 as the earliest times and at the times t4 to t5 as the newest times is shown by black circles. Furthermore, other vehicle B1 detected at times t2 to t3 is not detected at the times t3 to t4, but the black circles showing other vehicle B1 are added at the times t3 to t4. Herein, the prediction positions calculated by the notice map creation portion 26 are stored in the black circles of other vehicle B1 shown at the times t3 to t4.

Other vehicle B1 added in the notice map M4 is a motorbike that is detected by the milliwave radar 3 at the times t2 to t3 but is not detected at the times t3 to t4. As shown in the plan view of FIG. 15, the notice map creation portion 26 estimates that other vehicle B1, which is not detected by the milliwave radar 3, is situated behind other vehicle A1. In that case, other vehicle B1 is in a position which is not recognizable to the driver of the subject vehicle X at the times t3 to t4, but is considered as an obstacle that needs to be recognized by the driver. In this manner, in the notice map M4, the target which is the minimum that needs to be brought to the notice of the driver in the travelling environment of the subject vehicle X is extracted as a visual recognition point.

Next, the map comparison portion 22 performs the map comparison (S8). Herein, the map comparison portion 22 compares the eye target map created in the step S6 with the notice map created in the step S7. Furthermore, the map comparison portion 22 determines the obstacle becoming the driving support target by the comparison of the map. Specifically, the map comparison portion 22 determines the obstacle, which is not included in the eye target map, among the obstacles stored in the notice target extraction map, as an overlooked obstacle.

Figure 16:
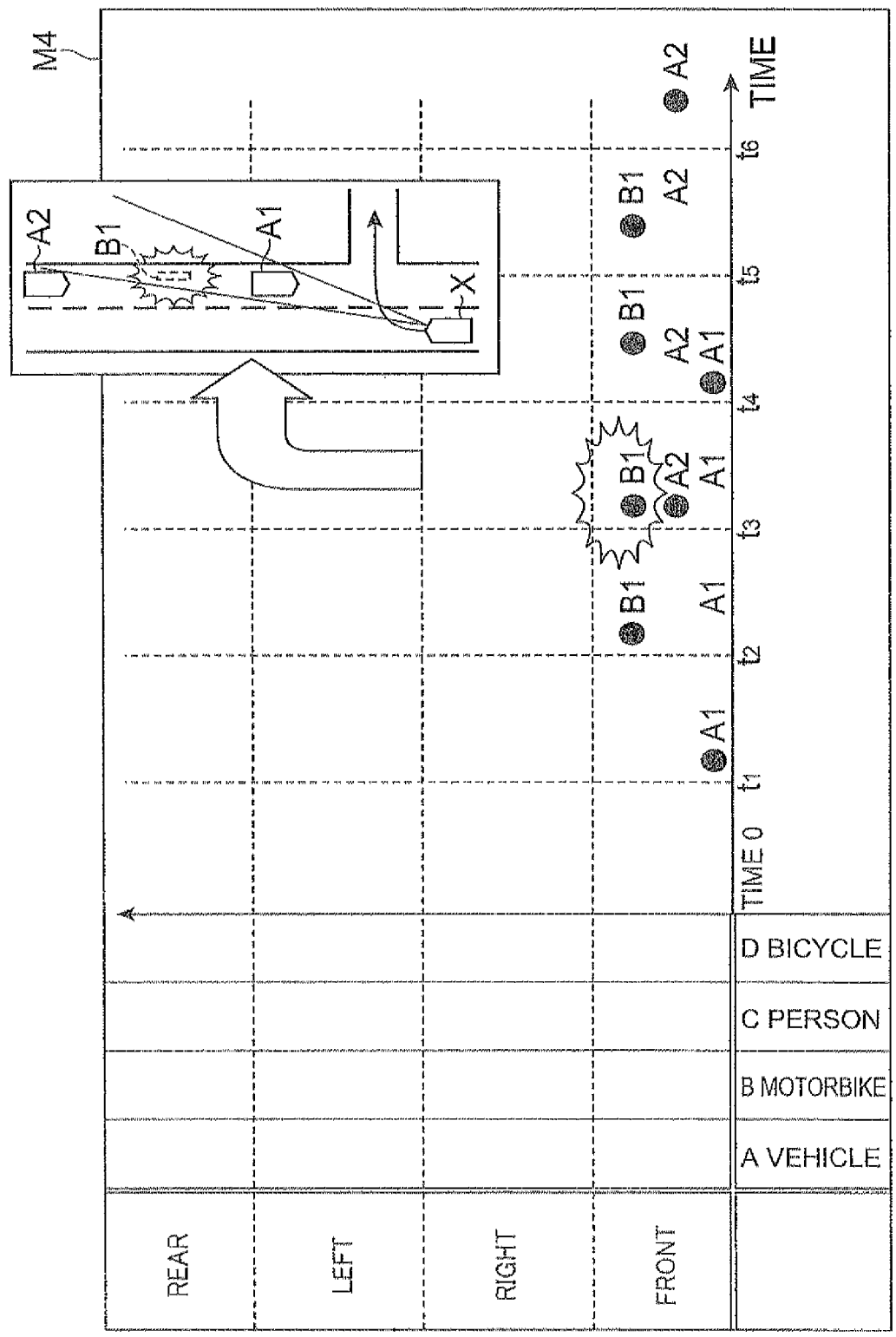
FIG. 16 is an explanation diagram of a map comparison in the processing of FIG. 4.

FIG. 16 is an explanation diagram of a map comparison in the processing of step S8. As shown in FIG. 16, the map comparison portion 22 determines other vehicle B1 shown at the times t2 to t3 by the map comparison as an overlooked target. Other vehicle B1 thus determined is a target which is the minimum that needs to be brought to the notice of the driver, but is a target which is not included in a time series visual recognition area as an area that is currently being recognized by the driver.

Next, the driving support control portion 23 performs the driving support (S9). Herein, the driving support control portion 23 performs the driving support so as to suggest information regarding the overlooked obstacle detected by the driving support control portion 23 to the driver. More specifically, the driving support control portion 23 creates the driving support signal including the position of the overlooked obstacle and the like and outputs the created driving support signal to the speaker 7 and the display 8. Moreover, the speaker 7 and the display 8 acquires the driving support signal from the driving support control portion 23 and informs the driver of the position of the overlooked obstacle and the like shown in the acquired driving support signal by means of sounds and images.

The driving support by the driving support device M is carried out by means of the series of processes described above.

Figure 17:
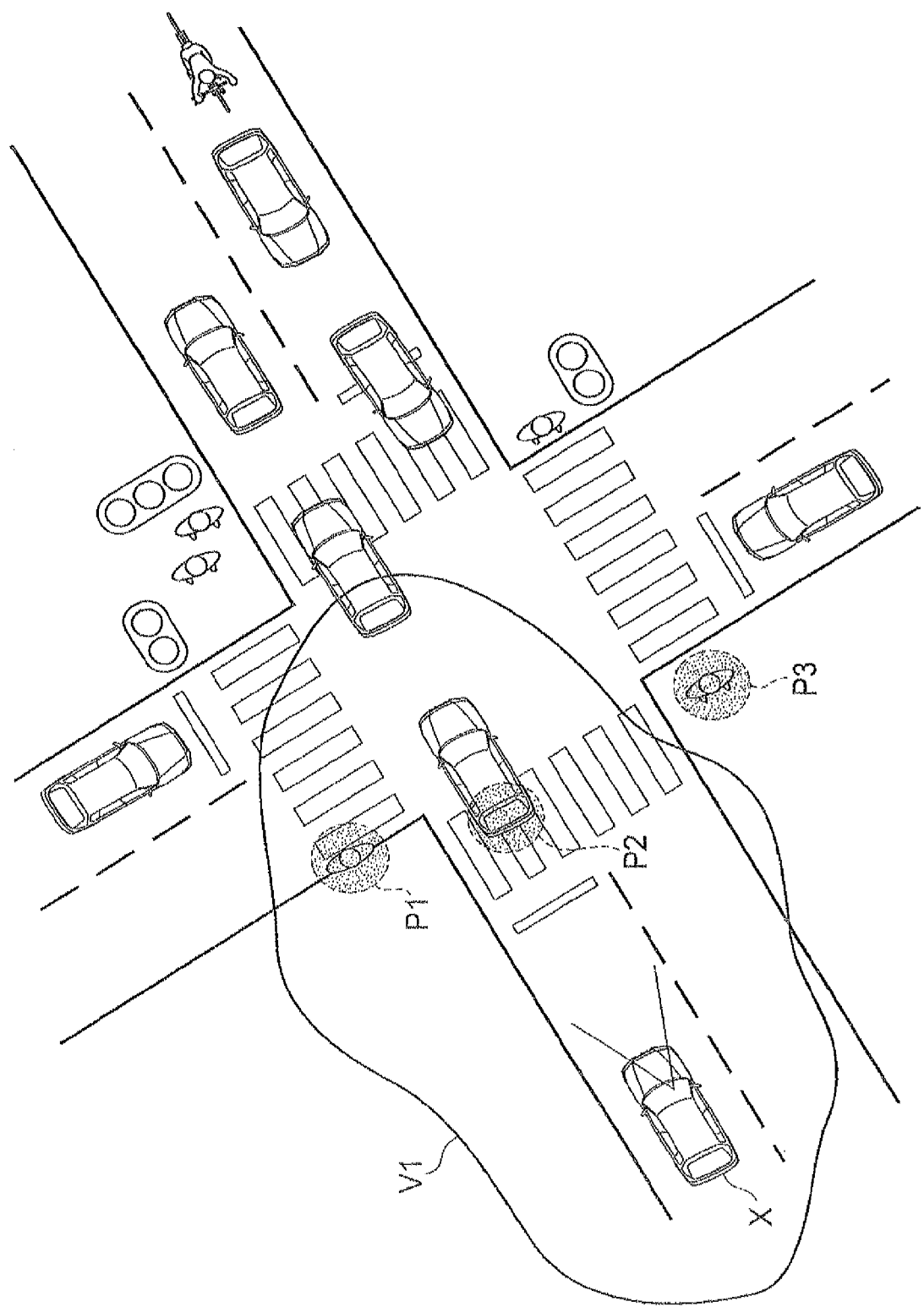
FIG. 17 is a diagram that shows a state in which a driving support is performed in an intersection.
Figure 18:
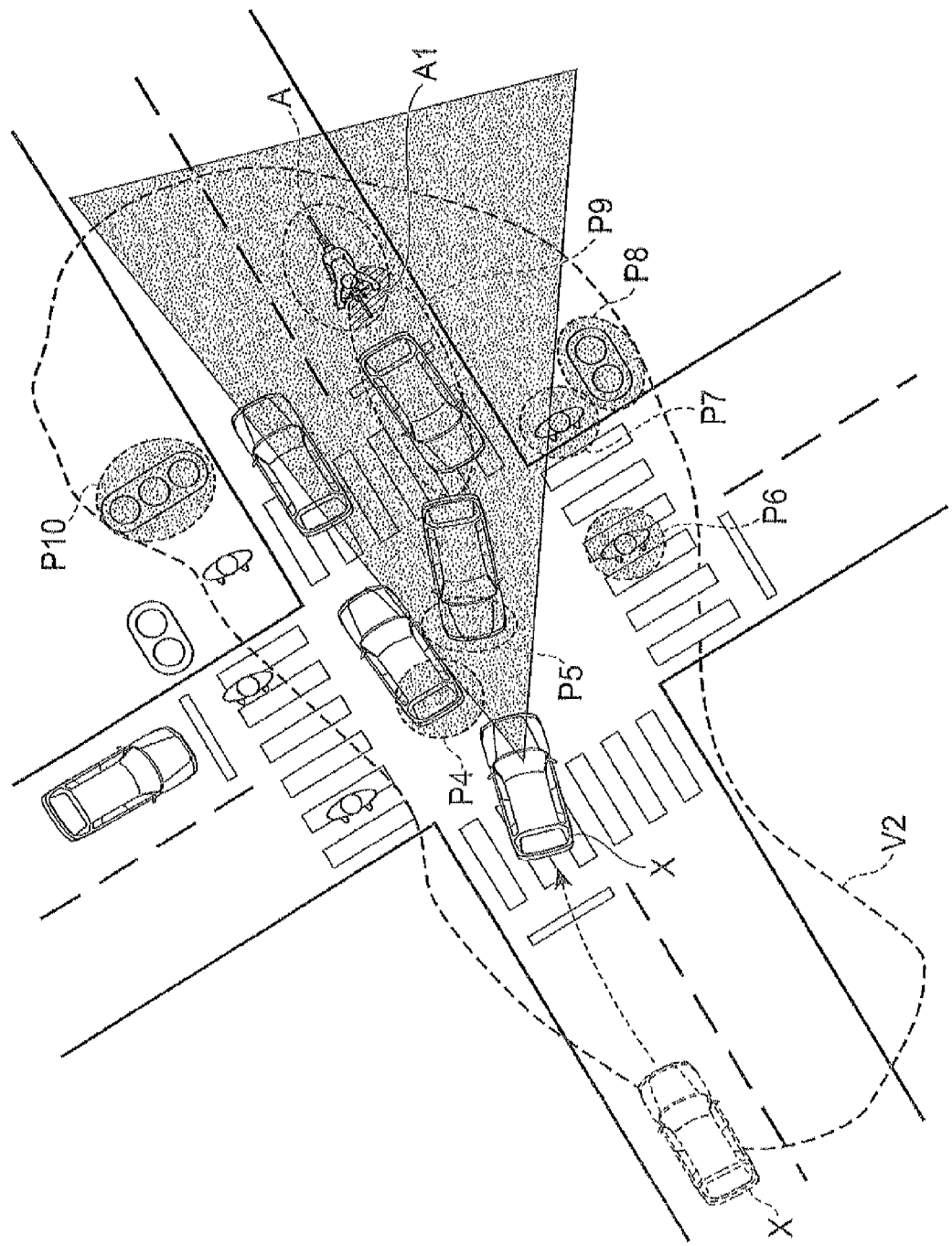
FIG. 18 is a diagram that shows a state after a predetermined time elapses from the state of FIG. 17.

FIGS. 17 and 18 show a state in which the driving support by the driving support device M is performed in the intersection. FIG. 17 shows a state in a time T=t−α, and FIG. 18 shows a state in a time T=t. In addition, a time α is a positive number. FIG. 17 show a time series visual recognition area V1 and observation points P1 to P3 which require attention. At this point of time, information regarding pedestrians situated in an observation point P3 not included in the time series visual recognition area V1 is suggested to the driver.

In addition, in FIG. 18 after the time α elapses from the state of FIG. 17, a time series visual recognition area V2 and observation areas P4 to P10 which require notice are shown. Furthermore, since a dead area A which becomes a dead area due to the other vehicle is excluded by the dead area exclusion portion 16, the dead area is not included in the time series visual recognition area V2. At this point of time, an overlap area A1 of an observation point P9 with the dead area A, which is a part of the observation point P9, is not included in the time series visual recognition area V2. Thus, information regarding a motorbike existing in the area A1 is suggested to the driver.

According to the related art, for example, a pedestrian situated in an observation point P6 of FIG. 18 becomes a support target because he deviates from the direction of eyes of the driver of the subject vehicle X. However, the observation point P6 is included in the area V2 which is currently being recognized by the driver between the time T=t−α and the time T−t. For this reason, information regarding the pedestrian is suggested to the driver, whereby the driver feels inconvenienced. Furthermore, in the related art, a motorbike existing in the area A1 is not detected in the direction of eyes of the driver of the subject vehicle X and thus is not a support target. Accordingly, information regarding the motorbike is not suggested to the driver. For this reason, it is difficult to perform the driving support for avoiding the collision between the subject vehicle X and the motorbike.

As mentioned above, according to the visual recognition area estimation device Ma relating to the present embodiment, the visual recognition area recognized by the driver is calculated by the visual recognition area calculation portion 11 based on the eyes of the driver. Furthermore, the time series area as the area currently recognized by the driver is estimated by the visual recognition time space map creation portion 14 based on the histories of a plurality of visual recognition areas V(T) to V(T−3) calculated from the past to the present for a predetermined time (see FIG. 12). In this manner, by estimating the time series visual recognition area also including the past visual recognition area, a driver can accurately estimate the area currently recognized. Furthermore, since the eyes of the driver are not correlated with the obstacle but based on the standard area, it is possible to prevent the throughput from becoming too large, whereby the estimation processing is possible in real time.

Furthermore, according to the visual recognition area estimation device Ma relating to the present embodiment by the caution degree setting portion 12, a degree of caution w of the driver relating to a plurality of visual recognition areas V(t) calculated from the past to the present for a predetermined time is set for each of the plurality of visual recognition areas. The degree of caution w is set, whereby the weighting of the degree of caution depending on an extent of novelty of the visual recognition area or the position within the visual recognition area is possible. Since the times series visual recognition area is estimated based on the histories of the plurality of weighted visual recognition areas, it is possible to accurately estimate the degree of caution of the driver in the time series visual recognition area.

Furthermore, usually, it is considered that the degree of caution of the current driver in the visual recognition area is reduced to the extent that the visual recognition area is in the past visual recognition area. According to the visual recognition area estimation device Ma relating to the present embodiment, a degree of caution w is set smaller as the time of the driver recognizing the visual recognition area becomes older, by means of the caution degree setting portion 12. In this manner, by reflecting a reduction in degree of caution w of the driver caused by the elapse of time to the visual recognition area, it is possible to more accurately estimate the caution state of the driver in the time series visual recognition area.

Furthermore, according to the visual recognition area estimation device Ma relating to the present embodiment, the basic visual recognition area V to be set based on the direction of eyes of the driver D is calculated by the basic visual recognition area calculation portion 15 (see FIG. 6). Furthermore, the dead area A of the driver D generated by the obstacle X existing in the basic visual recognition area V is excluded from the basic visual recognition area V by means of the dead area exclusion portion 16, whereby a dead angle exclusion visual recognition area Va is calculated (see FIG. 7). In this manner, by setting the area except for the dead area A as the visual recognition area, the dead area A, which is not actually recognizable by the driver D, is not included in the visual recognition area. Thus, it is possible to prevent an erroneous estimation in which the dead area A is determined as the visual recognition area.

Furthermore, according to the visual recognition area estimation device Ma relating to the present embodiment, when a mirror exists in the direction of eyes of the driver D, a mirror area M recognizable by the driver D via the mirror is added to the basic visual recognition area V by means of the mirror area addition portion 17, whereby the mirror addition visual recognition area Vb is calculated (see FIG. 8). In this manner, by setting the area added with the mirror area B as the visual recognition area, an area indirectly recognizable by the driver D via the mirror is included in the visual recognition area. Accordingly, it is possible to estimate the visual recognition area by an indirect visual recognition as well as a direct visual recognition.

Furthermore, according to the driving support device M relating to the present embodiment, the observation point that needs to be observed by the driver during a travelling environment is extracted by the notice map creation portion 26 (see FIG. 15). Furthermore, depending on whether or not the observation point is situated within the time series visual recognition area, the caution state of the driver relative to the observation point is determined by the map comparison portion 22 (see FIG. 16). In this manner, since the caution state is determined by the comparison of the time series visual recognition area with the observation point, there is no need to correlate the eyes of the driver with the observation point. Accordingly, it is possible to prevent the throughput from becoming too large, whereby the determination processing in real time is possible.

Furthermore, according to the driving support device M relating to the present embodiment, since the dead area A is excluded from the basic visual recognition area V by means of the visual recognition area estimation device Ma, when there is a likelihood that a protrusion or the like will be generated from an area hidden by the obstacle or the like, it is possible to gain the attention of the driver using the warning or the like. Furthermore, since the mirror area B is added to the basic visual recognition area V by means of the visual recognition area estimation device Ma, the driver does not call attention to the obstacle confirmed by the mirror, whereby the inconvenience of the driver can be reduced.

In this manner, in the driving support device M and the visual recognition area estimation device Ma according to the present embodiment, the area noticed by the driver is calculated after considering the time change of a scene, and the observation point that needs to be observed is narrowed down from the constantly changing surrounding environment. Moreover, by determining whether or not the narrowed down point is included in the calculated point, the overlooked obstacle can be detected. Thus, it is possible to suppress overconfidence of the driver without causing distrust or inconvenience for the driver.

As mentioned above, a preferred embodiment of the present invention has been described, but the present invention is not limited to the aforementioned embodiment. For example, in the aforementioned embodiment, although a case has been described where the milliwave radar is used so as to detect the obstacle, a laser radar or a camera may be used. Furthermore, in the aforementioned embodiment, although a case has been described where a camera is used so as to calculate the direction of eyes of the driver, a mounting type sensor may be used which detects the movement of muscles by means of the measurement of an eye potential around the eyeball of the driver.

Furthermore, in the aforementioned embodiment, although it is described that the effective viewing angle and the range of the driver depending on the vehicle speed of the subject vehicle are stored, for example, the calculation condition of the visual recognition area may be changed depending on the sight of the driver or the circumferential brightness. Furthermore, in the aforementioned embodiment, although the degree of caution set for the visual recognition area is used for the decision of the recording or the removal in the visual recognition area recording portion 13, the aspect of the information suggestion to the driver may be changed, for example, by changing the volume of the speaker 7 depending on the degree of caution.

INDUSTRIAL APPLICABILITY

According to the present invention, it is possible to accurately estimate an area recognized by a driver in real time.

REFERENCE SIGNS LIST

11 . . . visual recognition area calculation portion (visual recognition area calculation means), 12 . . . caution degree setting portion (caution degree setting means), 14 . . . visual recognition time space map creation portion (time series visual recognition area estimation means), 15 . . . basic visual recognition calculation portion (basic visual recognition calculation means), 16 . . . dead area exclusion portion (dead area exclusion means), 17 . . . mirror area addition portion (mirror area addition means), 22 . . . map comparison portion (observation point extraction means), 26 . . . notice map creation portion (caution state determination means), A . . . dead area, B . . . mirror area, M . . . driving support device, Ma . . . visual recognition area estimation device, P1 to P10 . . . observation point, T . . . time, V . . . basic visual recognition area, V1, V2 . . . time series visual recognition area, Va . . . dead angle exclusion visual recognition area (visual recognition area), Vb . . . mirror addition visual recognition area (visual recognition area), w . . . degree of caution, Z . . . obstacle

The invention claimed is:

1. A visual recognition area estimation device comprising:
visual recognition area calculation means that calculates a visual recognition area recognized by a driver based on eyes of the driver;
time series visual recognition area estimation means that estimates a time series visual recognition area as an area which is currently being recognized by the driver based on histories of a plurality of visual recognition areas calculated from past to present for a predetermined time, and
caution degree setting means that sets degrees of caution of the driver relating to a plurality of visual recognition areas, which are calculated from past to present for the predetermined time, for each of the plurality of visual recognition areas;
wherein the caution degree setting means sets the degree of caution smaller as the time of the driver recognizing the visual recognition area becomes older.

2. The visual recognition area estimation device according to claim 1,
wherein the visual recognition area calculation means includes
basic visual recognition area calculation means that calculates a basic visual recognition area which is set based on the direction of eyes of the driver; and
dead area exclusion means that estimates a dead area of the driver generated by an obstacle existing in the basic visual recognition area, and calculates the visual recognition area by excluding the dead area from the basic visual recognition area.

3. The visual recognition area estimation device according to claim 1,
wherein the visual recognition area calculation means includes
basic visual recognition area calculation means that calculates a basic visual recognition area which is set based on the direction of eyes of the driver; and
mirror area addition means that estimates a mirror area recognizable by the driver via a mirror when the mirror exists in the direction of eyes of the driver, and calculates the visual recognition area by adding the mirror area to the basic visual recognition area.

4. A driving support device comprising:
a visual recognition area estimation device comprising:
visual recognition area calculation means that calculates a visual recognition area recognized by a driver based on eyes of the driver;
time series visual recognition area estimation means that estimates a time series visual recognition area as an area which is currently being recognized by the driver based on histories of a plurality of visual recognition areas calculated from past to present for a predetermined time, and
caution degree setting means that sets degrees of caution of the driver relating to a plurality of visual recognition areas, which are calculated from past to present for the predetermined time, for each of the plurality of visual recognition areas;
wherein the caution degree setting means sets the degree of caution smaller as the time of the driver recognizing the visual recognition area becomes older;
observation point extraction means that extracts an observation point that needs to be observed by the driver from a travelling environment; and
caution state determination means that determines a caution state of the driver relative to the observation point depending on whether or not the observation point is situated within the time series visual recognition area.

5. A visual recognition area estimation device comprising:
visual recognition area calculation portion that calculates a visual recognition area recognized by a driver based on eyes of the driver;
time series visual recognition area estimation portion that estimates a time series visual recognition area as an area which is currently being recognized by the driver based on histories of a plurality of visual recognition areas calculated from past to the present for a predetermined time, and
caution degree setting portion that sets degrees of caution of the driver relating to a plurality of visual recognition areas, which are calculated from past to present for the predetermined time, for each of the plurality of visual recognition areas;
wherein the caution degree setting portion sets the degree of caution smaller as the time of the driver recognizing the visual recognition area becomes older.

* * * * *